United States Patent
Migdal et al.

[19]

[11] Patent Number: 5,870,220
[45] Date of Patent: Feb. 9, 1999

[54] PORTABLE 3-D SCANNING SYSTEM AND METHOD FOR RAPID SHAPE DIGITIZING AND ADAPTIVE MESH GENERATION

[75] Inventors: Alexander Migdal; Michael Petrov; Alexei Lebedev, all of Princeton, N.J.

[73] Assignee: Real-Time Geometry Corporation, Princeton, N.J.

[21] Appl. No.: 679,498

[22] Filed: Jul. 12, 1996

[51] Int. Cl.$^6$ ................................................ G02B 26/08
[52] U.S. Cl. .......................... 359/216; 359/196; 359/17; 359/18; 250/559.22; 356/376
[58] Field of Search ................................ 359/17, 18, 196, 359/197, 216, 217, 218, 219; 356/376; 250/559.22, 559.23

[56] References Cited

U.S. PATENT DOCUMENTS

| | | | |
|---|---|---|---|
| 4,238,147 | 12/1980 | Stern . | |
| 4,297,034 | 10/1981 | Ito et al. . | |
| 4,357,070 | 11/1982 | Fukushima et al. | 439/287 |

(List continued on next page.)

FOREIGN PATENT DOCUMENTS

| | | | |
|---|---|---|---|
| 1295039 | 1/1992 | Canada . | |
| 1332633 | 10/1994 | Canada . | |
| 0 632 349 A1 | 1/1995 | European Pat. Off. . | |
| 4-110707 | 4/1992 | Japan | 356/376 |
| 2264601 | 9/1993 | United Kingdom . | |
| 2264602 | 9/1993 | United Kingdom . | |
| WO 96/06325 | 2/1996 | WIPO . | |

OTHER PUBLICATIONS

Hoppe, Hugues, "Surface Reconstruction from Unorganized Points", pp. 1–116, 1994.

Eck, Matthias et al., "Multiresolution Analysis of Arbitrary Meshes", pp. 1–25.

DeRose, Tony et al., "Fitting of Surfaces to Scattered Data", 6 pages.

Hoppe, Hugues, "Generation of 3D Geometric Models from Unstructured 3D Points", 4 pages.

Turk, Greg et al., "Zippered Polygon Meshes from Range Images", 4 pages.

Rioux, Marc et al., "White Laser, Synced Scan," *IEEE Computer Graphics and Applications*, vol. 13, No. 3, pp. 15–17 May 1993.

Carlbom, Ingrid, et al., "Modeling and analysis of empirical data in collaborative environments" *Communications of the ACM*, vol. 35, No. 6, Jun. 1992, p. 74. .

(List continued on next page.)

*Primary Examiner*—James Phan
*Assistant Examiner*—Darren E. Schuberg
*Attorney, Agent, or Firm*—Kenyon & Kenyon

[57] ABSTRACT

A portable 3D scanning system collects 2D-profile data of objects using a combination of a laser-stripe positioning device and a video camera which detects the images of the laser stripe reflected from the object. The scanning system includes a laser-stripe generator, a video camera, a scanning mirror attached to a continuously rotating motor, an encoder or a photodiode operationally coupled to the motor, and associated electronics. As the rotating, scanning mirror reflects the laser stripe and variably positions the laser stripe across the object, the encoder or the photodiode generates signals indicating the angular position of the mirror. The video images of the reflected laser stripes are stored on a storage medium, while data relating to the angular positions of the laser stripes recorded in the video images are simultaneously stored on a storage medium. A computer subsequently synchronizes and processes the recorded laser stripe data with the angular-position data to generate a 3D model of the object by applying triangulation calculation and other post-scanning methods, e.g., multi-resolution analysis and adaptive-mesh generation. The multi-resolution analysis, which applies more points to resolve fine details and fewer points for smooth regions of the objects, leads to significant data compression. The adaptive mesh, which include connected polygonal elements and which may have multiple resolutions and tolerances, is generated by the adaptive-mesh generating routine.

57 Claims, 13 Drawing Sheets

U.S. PATENT DOCUMENTS

| | | |
|---|---|---|
| 4,529,305 | 7/1985 | Welford et al. . |
| 4,529,316 | 7/1985 | DiMatteo . |
| 4,575,805 | 3/1986 | Moermann et al. . |
| 4,627,734 | 12/1986 | Rioux . |
| 4,645,347 | 2/1987 | Rioux . |
| 4,653,104 | 3/1987 | Tamura . |
| 4,705,401 | 11/1987 | Addleman et al. . |
| 4,737,032 | 4/1988 | Addleman et al. . |
| 4,794,262 | 12/1988 | Sato et al. ............................ 250/559.22 |
| 4,800,270 | 1/1989 | Blais . |
| 4,800,271 | 1/1989 | Blais . |
| 4,825,263 | 4/1989 | Desjardins et al. . |
| 4,832,629 | 5/1989 | Sasaki et al. ............................ 439/883 |
| 4,948,258 | 8/1990 | Caimi . |
| 4,952,149 | 8/1990 | Duret et al. . |
| 4,961,155 | 10/1990 | Ozeki et al. . |
| 4,965,665 | 10/1990 | Amir . |
| 4,982,102 | 1/1991 | Inoue et al. ......................... 250/559.22 |
| 5,018,854 | 5/1991 | Rioux . |
| 5,027,281 | 6/1991 | Rekow et al. . |
| 5,030,008 | 7/1991 | Scott et al. . |
| 5,102,223 | 4/1992 | Uesugi et al. . |
| 5,102,224 | 4/1992 | Uesugi et al. . |
| 5,104,227 | 4/1992 | Uesugi et al. . |
| 5,108,320 | 4/1992 | Kimber .................................... 439/883 |
| 5,127,061 | 6/1992 | Amir et al. . |
| 5,164,793 | 11/1992 | Wolfersberger et al. . |
| 5,177,556 | 1/1993 | Rioux . |
| 5,187,364 | 2/1993 | Blais . |
| 5,193,120 | 3/1993 | Gamache et al. . |
| 5,196,900 | 3/1993 | Pettersen . |
| 5,216,236 | 6/1993 | Blais . |
| 5,218,427 | 6/1993 | Koch . |
| 5,270,795 | 12/1993 | Blais . |
| 5,280,542 | 1/1994 | Ozeki et al. . |
| 5,305,092 | 4/1994 | Mimura et al. . |
| 5,345,490 | 9/1994 | Finnigan et al. . |
| 5,377,011 | 12/1994 | Koch . |
| 5,381,236 | 1/1995 | Morgan . |
| 5,416,591 | 5/1995 | Yoshimura et al. . |
| 5,418,608 | 5/1995 | Caimi et al. . |
| 5,424,835 | 6/1995 | Cosnard et al. . |
| 5,436,655 | 7/1995 | Hiyama et al. . |
| 5,444,537 | 8/1995 | Yoshimura et al. . |
| 5,446,549 | 8/1995 | Mazumder et al. . |
| 5,473,436 | 12/1995 | Fukazawa . |
| 5,481,483 | 1/1996 | Ebenstein . |
| 5,506,683 | 4/1996 | Yang et al. . |
| 5,509,090 | 4/1996 | Maruyama et al. . |
| 5,513,276 | 4/1996 | Theodoracatos . |
| 5,529,509 | 6/1996 | Hayes et al. ............................ 439/883 |
| 5,577,927 | 11/1996 | Okada et al. ............................ 439/287 |

OTHER PUBLICATIONS

Jones, P.F. et al., "Comparison of three three–dimensional imaging systems," *J. Opt. Soc. Am. A*, vol. 11, No. 10, Oct. 1994, pp. 2613–2621

Hausler, Gerd et al., "Light sectioning with large depth and high resolution," *Applied Optics*, vol. 27, No. 24, Dec. 15, 1988, pp. 5165–5169.

Motamedi, M. Edward et al., "Miniaturized micro–optical scanners," *Optical Engineering*, vol. 33, No. 11, Nov. 1994, pp. 3616–3623.

Rioux, Marc et al., "Design of a large depth of view three–dimensional camera for robot vision," *Optical Engineering*, vol. 26, No. 12, Dec. 1987, pp. 1245–1250.

Trepte, Oliver et al., "Computer control for a galvanometer scanner in a confocal scanning laser microscope," *Optical Engineering*, vol. 33, No. 11, Nov. 1994, pp. 3774–3780.

Strand, T.C., "Optical three–dimensional sensing for machine vision," *Optical Engineering*, vol. 24, No. 1, Jan./Feb. 1985, pp. 033–040.

Busch, David D., "Getting the Picture," *Windows Sources*, Nov. 1995, pp. 114–136.

Marshall, G.F., "Scanner refinements inspire new uses", *Laser Focus World*, Jun. 1994, pp. 2–6.

Ludwiszewski, Alan, "Standards for Oscillatory Scanners," *General Scanning Inc.*, Feb. 1993, pp. 1–21.

"Cyberware Corporate Backgrounder", *Cyberware WWW Support (Internet Site)*, Jan. 16, 1996 (last update).

PORTABLE 3-D SCANNING SYSTEM AND METHOD FOR RAPID SHAPE DIGITIZING AND ADAPTIVE MESH GENERATION

FIELD OF THE INVENTION

This invention relates generally to three-dimensional ("3D") scanning and measuring systems, and relates particularly to a portable 3D scanning system and method which facilitate acquisition and storage of data relating to 3D profiles of objects for subsequent computer-aided data processing and reproduction of the 3D profiles of the objects by shape digitizing and adaptive mesh generation.

BACKGROUND OF THE INVENTION

Speed, accuracy, and portability have been recurrent and difficult to achieve goals for devices that scan, measure or otherwise collect data about 3D objects for purposes such as reproduction. With the advent of computers, such devices have useful application in many fields, such as digital imaging, computer animation, topography, reconstructive and plastic surgery, dentistry, architecture, industrial design, anthropology, biology, internal medicine, milling and object production, and other fields. These computer-aided systems obtain information about an object and then transform the shape, contour, color, and other information to a useful, digitized form.

The technology currently available for shape digitizing falls into two distinct but related groups: mechanical systems and optical systems. All systems within those two general categories struggle with the basic criteria of speed, accuracy, and portability in measuring and generating information about an object.

A mechanical system acquires data about an object through the use of a probe that has a sensitive tip. The mechanical system scans an object by manually moving its probe tip across the object's surface and taking readings. Generally, the probe connects to a mechanical arm, and the system tracks the probe's position in space using angle measuring devices as the arm moves. The system calculates the position of the probe with coordinates known from the angle measuring devices.

Although mechanical systems scan with generally high accuracy, the rate at which a mechanical system acquires data is relatively slow and can take several hours for scanning and digitizing. A typical mechanical system measures only one point at a time and can digitize only small, solid objects.

As an alternative to mechanical systems, there are several types of optical object shape digitizers which fall into two basic categories: systems based on triangulation and alternative systems. A triangulation system projects beams of light on an object and then, determines three-dimensional spatial locations for points where the light reflects from the object. Ordinarily, the reflected light bounces off the object at an angle relative to the light source. The system collects the reflection information from a location relative to the light source and then determines the coordinates of the point or points of reflection by triangulation. A single dot system projects a single beam of light which, when reflected, produces a single dot of reflection. A scan line system sends a plane of light against the object which projects on the object on a line and reflects as a curvilinear-shaped set of points describing one contour line of the object. The location of each point in that curvilinear set of points can be determined by triangulation.

Some single dot optical scanning systems use a linear reflected light position detector to read information about the object. In such systems a laser projects a dot of light upon the object. The linear reflected light position detector occupies a position relative to the laser which allows the determination of a three dimensional location for the point of reflection. A single dot optical scanner with a linear reflected light position detector can digitize only a single point at a time. Thus, a single dot optical scanning system, like the mechanical system described above, is relatively slow in collecting a full set of points to describe an object. Single dot optical scanners are typically used for applications such as industrial engineering. The digitizing speed is usually slow and is limited by the mechanics of the scanning system, i.e., the moving and positioning of the light beam. However, accuracy of these systems can be high. A scanning head can be mounted on a high-precision, but costly, positioning system to take a digitized image of the object's shape with generally good accuracy. However, because of the high cost, slow speed, and lack of flexibility, single dot optical scanners find generally only limited application.

Scan line systems offer one solution to the speed time bottleneck of single point triangulation system. Those systems typically employ a 2D imager, such as a charged coupled device (CCD) camera, for signal detection. The systems project a light plane (i.e., a laser stripe) instead of just one dot and then read the reflection of multiple points depicting the contour of an object at a location that is a distance from the CCD camera and from which the position can be triangulated. Some embodiments of the scan line-type system attach the CCD camera to a rotating arm or a moving platform. During scanning, either the object moves on a known path relative to the camera and laser, or the camera and laser, together, move around the object. In any case, such systems usually depend on this type of fixed rotational movement and typically use a bulky, high-precision mechanical system for positioning. Because of the use of mechanical positioning devices, resealing flexibility can be very limited, e.g., a scanner designed for objects the size of a basketball may not be useful for scanning apple-sized objects.

Some laser stripe triangulation systems currently available are further limited because the laser stripe stays at a fixed angle relative to the camera and the system makes its calculations based on the cylindrical coordinates of its rotating platform. The mathematical simplicity in such a projection system complicates the hardware portion of these devices as they typically depend on the rotational platform mentioned. Also, the simplified geometry does not generally allow for extremely refined reproduction of topologically nontrivial objects, such as objects with holes in them (e.g., a tea pot with a handle). Full realization of triangulation scanning with a non-restrictive geometry has not been achieved in the available devices.

Additionally, for those optical triangulation systems employing a computer, there is the further problem of processing the incoming data. The CCD camera typically outputs frames of picture information at a rate of 30 or more frames per second. Each frame is composed of a two dimensional frame matrix of pixels and contains, for example, 640×480 pixel values of light intensity information. Thus, laser stripe triangulation systems must sort through many megabytes of information. These systems typically require very powerful computers and have sizeable memory requirements. In addition, they take a relatively long time to process the incoming CCD information into a viable set of points concerning the object. The points created can depict the object, but the system that create them are also limited in that they typically do not achieve a sophisticated model of the object.

Apart from optical triangulation systems (single dot or scan line systems), there are alternative optical scanning systems which present a scanning solution different from those employing triangulation techniques. Range meters and multi-camera systems are among those categorized as "alternative" systems. Range meter systems typically use an infrared pulsed laser and mechanical scanning techniques to project a dot laser across an object and then measure the phase delay of the reflected signal. As range meter systems typically incorporate a single dot method of data collection, they generally have the speed limitations that are intrinsic to single-point scanners. Additional accuracy problems occur because depth coordinates are not sufficiently accurate, such that in some systems, when an object is large, ghosts can appear on the scan.

Another type of alternative scanning system is a stereoscopic system which uses several CCD cameras located at known distances from each other. The captured images are processed with a pattern recognition system which maps the various points of an object captured by the cameras, thereby obtaining the shape/contour information. One advanced stereoscopic system uses 16 CCD cameras. Although each camera in such a system has a small exposure time, it takes several minutes to analyze the data for each scan. This can cause the system to delay, sometimes up to six minutes per scan. In this type of system, the device must also project a special grid on an object to obtain reference points for gluing a complete 3D picture. In addition, accuracy is sometimes a problem because stereoscopic scanning relies on light reflecting properties. The systems make assumptions based on Lambertian reflecting properties to determine resolution surface features of the scanned objects. Different surfaces can dictate different results for the same object.

With respect to the embodiments of the 3D scanning systems which utilize a computer to control the scanning parameters, e.g., angular position of the light stripe at a given instant, much of the cost of such 3D scanning systems is attributable to the feedback circuit which allows the computer to control the scanning parameters of the system. Furthermore, because a computer is needed for scanning, practical portability may be difficult to achieve. Accordingly, an ideal, portable, inexpensive 3D scanning system should minimize the components, e.g., include just a video camera and a mechanism for variably projecting a light stripe onto a target object, and preferably not require a computer for scanning.

Thus, for devices that scan, measure or otherwise collect data about an object, it would be a substantial advance if a scanner could be created that could rapidly gather highly accurate data concerning a 3D object. It would also be an advance if the device could rapidly process the data in a fashion that did not require a large computing system (and allow for portable embodiments), and after computing, create a descriptive model from the data points collected about the object.

SUMMARY OF THE INVENTION

The present invention provides a high speed, accurate and portable system and method for rapidly measuring objects and processing the shape, contour, color and other data it collects for display, graphic manipulation, model building—such as through adaptive mesh generation—and other uses. Because the basic information about the object is obtained in rapid fashion, the invention is particularly suited to scan and measure objects which cannot easily stay motionless, such as people or animals. The mechanical and data processing features of the present invention permit the collected data to be processed with high accuracy.

The present invention provides a system for rapidly scanning an object with a geometric light shape (such as a laser stripe), recording the shape of the reflected points of light by means of an image collector (such as a camera), and, by a triangulation technique that does not depend on the fixed direction of the light source relative to the camera, reconstructing the 3D shape of the object through a computer using the data points collected from the reflection of the laser stripes. With the collected data points, a user can, inter alia, create, display and manipulate an image of the 3D object on a computer, physically reproduce the object (through computer controlled milling machines and stereolithography), compress the data for easy transmission (such as over the Internet), or use the data in graphic manipulation systems (such as in 3D video animators). The invention includes a model building algorithm which provides multi-resolution analysis and adaptive mesh generation, leading to significant compression of the digital shape information, which for most objects will be order of magnitude compression.

The present invention also provides embodiments which are portable (and not limited to any specific background) and can also be implemented using components readily available. A representative embodiment of the portable scanning system according to the present invention does not require a computer as part of the system because data processing contemporaneous with the data collection is obviated in this embodiment. Instead, the portable system collects 3D-profile data of objects and records the data on a storage medium. The data stored on the storage medium is subsequently processed, at any desired time, by a computer system which applies the above-mentioned data-processing routines, e.g., the model building algorithm which provides multi-resolution analysis and adaptive mesh generation. It should be noted, however, processing of the data collected using the portable scanning system according to the present invention need not be limited to the specific data-processing routines described herein.

In the portable scanning system according to the present invention, synchronization of the image-capturing device, e.g., a video camera, and the projection mechanism for variably projecting a stripe of light is not achieved at the time of actual scanning. By avoiding the synchronization issue at the time of actual scanning, the need to utilize a computer to simultaneously control the projection mechanism and the video camera is also obviated. Instead, the portable scanning system according to the present invention records on one or more data storage medium both the video data and data relating to the angular positions of the light stripe during scanning. When the recorded data is eventually processed by a computer, the angular-position data is synchronized with the video data. Several implementations of the synchronization scheme are utilized in the portable scanning system according to the present invention.

The portable scanning system according to the present invention utilizes the principle of optical triangulation. The scanning system includes a laser-stripe generator, a video camera, a scanning mirror attached to a continuously rotating motor, and associated electronics. Optionally, the scanning system may also include an encoder or a photodiode coupled to the motor and a light source for providing ambient light. The rotating, scanning mirror reflects the laser stripe and variably positions the laser stripe across a target object. During scanning, the angular positions of the scanning mirror are encoded, and the encoded data reflecting the angular positions is recorded. The camera, which is positioned at a triangulation distance from the target object, detects the laser-stripe on the object and records the video data. If the relative geometry of the components of the scanning system and the angle of the scanning mirror relative to the object are known, the computer can calculate the depth component of the 3D profile of the target object by combining the video data and the encoded data reflecting the angular positions of the scanning mirror.

The present invention provides a further aspect related to rapid processing by providing a system to compress the video camera information as it is input to the computer. In an embodiment of the present invention employing a camera as an image collector, a large amount of video signal information (bytes converted from analog signals) comes to the computer memory for processing. The present invention provides a system which rapidly processes the information by compressing the image information and keeping from each image only the information about the reflected data points collected from the positioned laser stripes.

Instead of storing megabytes of information, the data compression system of the present invention reduces the raw data down to only a few kilobytes depending upon the application. As data arrives, the computer applies an "on the fly" test as it first comes into a memory buffer, with the computer rejecting pixel values that fail the test. The compacted data allows for easier, speedier processing and alleviates the need for massive computing power to complete the scanning process. A currently available personal computer is all that is necessary to implement the data gathering system of the present invention.

The present invention also provides features that allow for more accurate measurement of the object and better display of its image. One feature provided is a system to eliminate "noise" from the image information and determine the most accurate 3D spatial location of any reflection data point on the object to the degree of "subpixel accuracy". The image of the data point created by a laser stripe reflection can be three or more pixels wide, but the most intense portion of the point will be located in only a portion of a pixel. The invention refines the collected data points to subpixel accuracy by locating the most likely center of the data point according to calculation heuristics.

Another feature of the present invention in performing shape digitization is to obtain only the essential information when collecting shape data and color information about an object. In the present invention, it is not necessary in obtaining shape data to process full color information during scanning. The present invention features the ability in an exemplary embodiment to intake laser stripe scanning information about an object with an electronic camera, and to capture that information in black and white or through a single color port, such as the red. The present invention provides that color information about the object can be separately gathered apart from the collection of data points by laser stripe scanning and later matched and used with the three-dimensional data points.

BRIEF DESCRIPTION OF THE DRAWINGS

FIG. 1b illustrates some of the geometric relationships among various components of the first exemplary embodiment of the portable scanning system according to the present invention shown in FIG. 1a.

DETAILED DESCRIPTION OF THE INVENTION

Figure 1A:
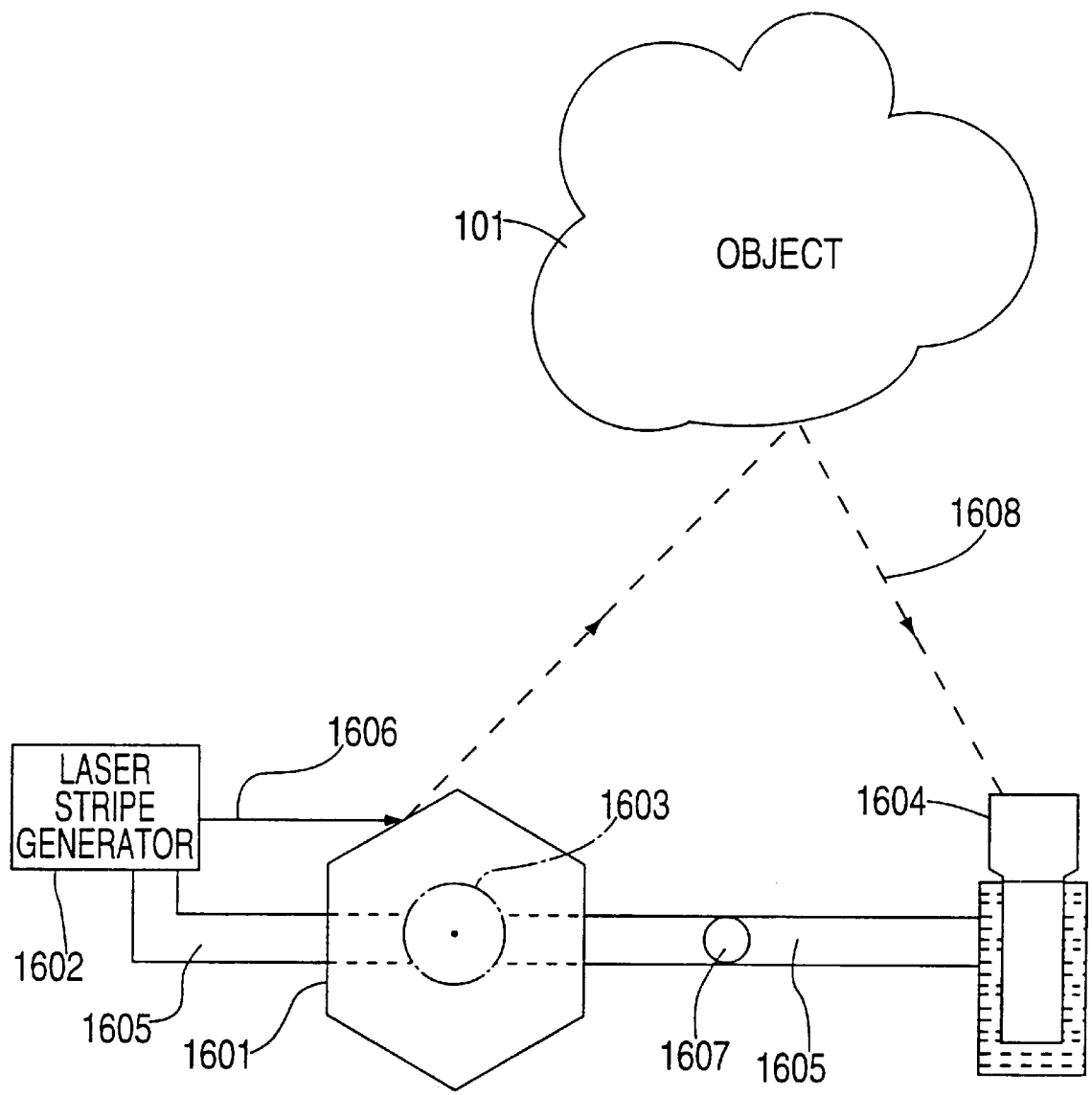
FIG. 1a illustrates a first exemplary embodiment of the portable scanning system according to the present invention.

As shown in FIG. 1a, a basic embodiment of a portable scanning system according to the present invention includes a laser-stripe generator 1602, a video camera 1604, a continuously spinning motor 1603 and a scanning mirror 1601 attached to the continuously spinning motor 1603. The rotating, scanning mirror reflects the laser stripe 1606 and variably positions the laser stripe across a target object 101. The video camera, which is positioned relative to the target object at a distance which allows triangulation calculation, detects the laser stripe 1608 reflected from the object and records a sequence of image frames each containing an image of the reflected laser-stripe. The combination of the scanning mirror 1601 attached to the continuously spinning motor 1603, the laser-stripe generator 1602, and the video camera 1604 are preferably mounted on a mechanical holder 1605. The mechanical holder 1605, which allows the triangulation distance between the scanning mirror 1601 and the video camera 1604 to be varied by manipulation of the adjustment mechanism 1607, may be in turn mounted on a standard camera tripod, which is not shown.

In the embodiment illustrated in FIG. 1a, the motor 1603 may be a simple DC/AC motor with a gear head. The motor 1603 rotates at a constant speed in the range of 2–4 revolutions per minute (rpm), for example. The angular velocity of the motor 1603 may be adjusted for varying levels of scanning quality and scanning time. High stability of rotation speed of the motor is not required for the portable scanning system according to the present invention. Because virtually no load is applied to the motor 1603, the motor may be a miniature motor such as model 2230V012S22B sold by MicroMo Corp. of Clearwater, Fla. The model2230V012S22B is approximately 2" deep, including the gear head, and 0.7" in diameter.

The mirror 1601 shown in FIG. 1*a* is a polygonal mirror which has, for example, 6 symmetrical facets. For each degree of angular movement of the motor 1603, the laser stripe 1606 sweeps two degrees of field of view of the video camera 1604. Accordingly, each of the six facets of the mirror 1601 sweeps 120 degrees ((360 degrees/6)×2)=120 degrees) of field of view during each rotation of the motor 1603. The mirror 1601 may alternatively have 5–12 symmetrical facets. If the mirror 1601 has, for example, 8 facets, each facet will sweep 90 degrees ((360 degrees/8)×2=90 degrees) of field of view during each rotation of the motor 1603. Since a typical video camera has a maximum field of view of about 60 degrees, the whole field of view of the video camera will be covered by a sweep of each facet of the mirror as long as the polygonal mirror has 12 or fewer facets. The multi-faceted, polygonal mirror 1601 allows the portable embodiments of the scanning system according to present invention to achieve shorter "dead periods," i.e., periods when no laser stripe is positioned on the target object, during scanning in comparison to an embodiment utilizing a single, flat mirror mounted on a constant-speed motor.

The video camera 1604 may be any one of the commercially available video cameras as long as the chosen video camera outputs sufficiently high-resolution, real-time video signals. Typical, commercially available video cameras have a resolution ranging from 320×240 pixels per image frame up to 640×480 pixels per image frame. In addition, typical video cameras have an operating speed of 30 image frames per second, which is equivalent to 60 image fields per second. A typical, commercially available video camcorder, which combines a video camera with a recording mechanism, is adapted to record the video signals on a storage medium such as a video cassette tape.

Assuming that the video camera 1604 shown in FIG. 1*a* has a resolution of 640×480 pixels resolution and an operating speed of 60 fields per second, about 50–200 laser-stripe images should be recorded to recreate a 3D image of the scanned object. Accordingly, if one laser-stripe image is captured in each image field, the scanning time for obtaining 50–200 laser-stripe images would be approximately 1 to 3 seconds. As explained below, the time required to scan the target object will depend on the angular velocity of the motor 1603 and the desired number of laser-stripe images for a given scan. If the angular velocity of the motor is 4 rpm, for example, and the scanned object corresponds to 30 degrees within the field of view of the camera, then each of the six facets of the mirror 1601 will sweep 30 degree field of view in (30 degrees/2)×(60 seconds/(4×360 degrees))= 0.625 second. In this case, the time required to scan the object will be a function of the desired number of scan lines. If, on the other hand, the motor 1603 has an angular velocity of 2 rpm and 60 laser stripe images are desired for scanning an object which corresponds to 30 degrees within the field of view of the camera, the video camera 1604 will record 60 image fields in 1 second, but the scanning mirror will sweep across only (30 degrees/1.25 second)×(1 second)=24 degrees in 1 second. In this case, the time required to scan the target object will be dependent on the time required for the mirror to sweep 30 degrees in the camera's field of view.

Figure 1B:
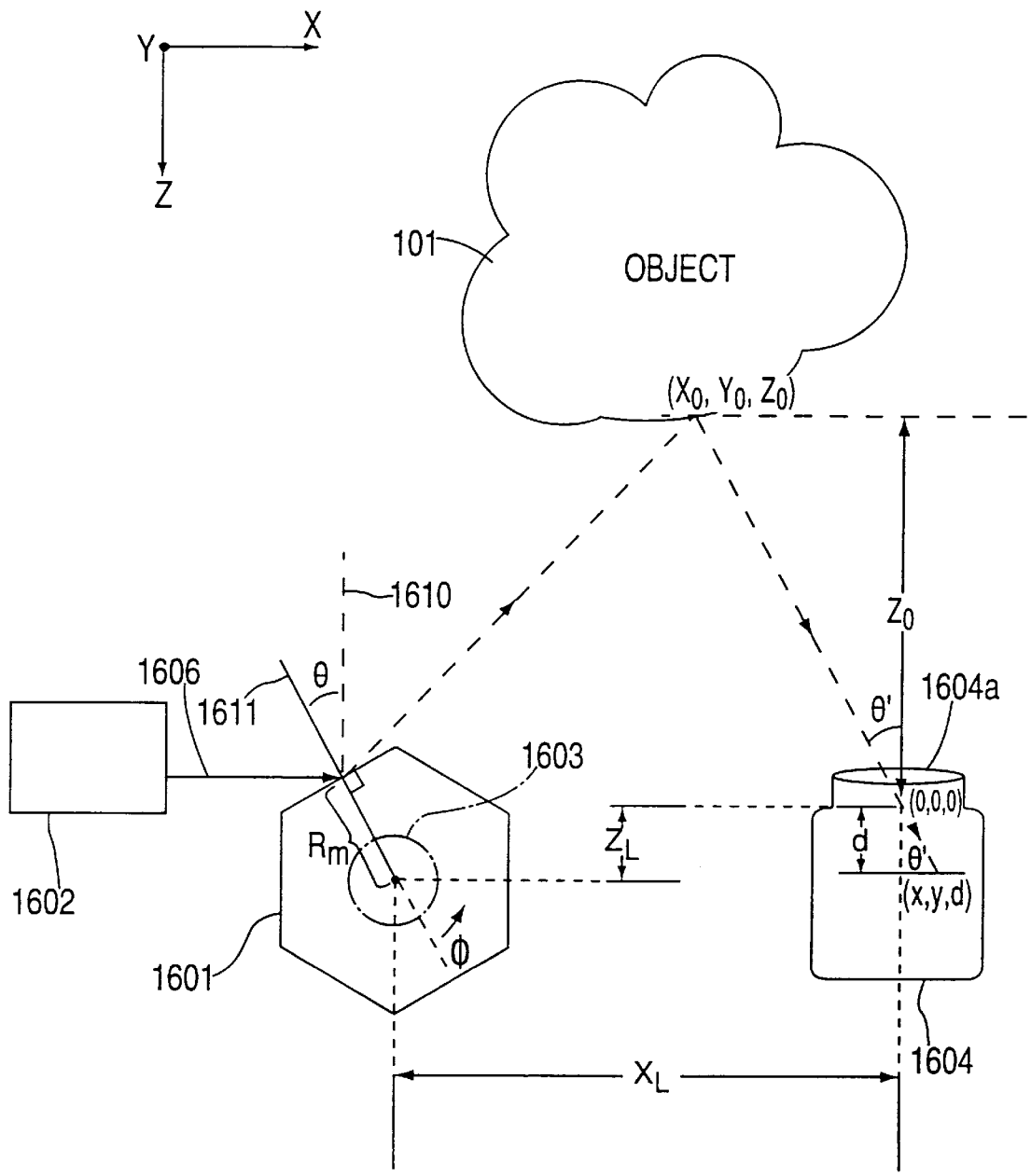

With respect to FIG. 1*b*, which illustrates some of the geometric parameters of the various components of the embodiment of the portable scanning system according to the present invention illustrated in FIG. 1*a*, if the relative geometry of the components of the scanning system, e.g., distances $X_L$ and $Z_L$ between the origin of the coordinate system and the rotation axis of the motor 1603, perpendicular distance $R_m$ between the rotation axis and a given facet of the mirror 1603, and the angle of the scanning mirror relative to the object, i.e., the angle $\Theta$ of approach of the laser stripe on the object, are known, the computer can calculate the depth component $Z_0$ of the 3D profile of the scanned portion of the target object by performing the triangulation calculation with the two-dimensional coordinates of the scanned portion of the target object stored in the video image frames.

As can be seen from FIG. 1*b*, the three-dimensional coordinate system for the scanning system according to the present invention is centered at the focal point of the focusing lens 1604*a* of the camera 1604, with the Y-coordinate extending perpendicular to the plane defined by the drawing sheet. The distance d shown in FIG. 1*b*, which may be described as the focal point location value representing the relationship between the focal point and the image plane (light collection plate) 1604*b*, is ascertained by a calibration procedure which is described in detail in a commonly-owned U.S. Patent Application entitled "High Accuracy Calibration for 3D Scanning and Measuring Systems" by A. Migdal, A. Lebedev, M. Petrov and A. Zhilyaev, which application is filed concurrently with the present application and expressly incorporated herein by reference. The distance $R_m$ is determined by measurement, and the distances $X_L$ and $Z_L$ are determined by the calibration procedure described in the "High Accuracy Calibration for 3D Scanning and Measuring Systems" application. Although the distance $Z_L$ illustrated in FIG. 1*b* need not be zero, $Z_L$ may be assumed to be zero for the sake of simplicity of explanation in the following discussion. Similarly, the rotational axis of the motor 1603, which need not be coincident with the Y-axis, is assumed to be coincident with the Y-axis for the sake of simplicity of explanation in the following discussion.

Continuing with the description of the scanning system in conjunction with FIG. 1*b*, the angle $\theta'$ can be ascertained based on the image coordinate (x,y,d) on the image plane 1604*b* corresponding to the scanned, actual coordinate ($X_0$, $Y_0$, $Z_0$). Since the distances $X_L$, $Z_L$ and $R_m$, as well as the angle $\theta'$, are known, the Z-coordinate distance $Z_0$ of the scanned point on the target object may be ascertained if the angle $\theta$, which indicates the angle of approach of the laser stripe relative to the target object 101 for the scanned, actual coordinate ($X_0$, $Y_0$, $Z_0$), is known. The angle $\theta$ is the angular separation between the normal vector to the given mirror facet and an axis parallel to the Z-axis of the coordinate system. Accordingly, the remaining issue in calculating the depth component of the 3D profile of the target object is how to ascertain the angle $\theta$ of the scanning mirror, i.e., the angle of approach of the laser stripe relative to the target object for a given light-stripe position as recorded in the stored video image frames. Several different approaches may be taken in addressing the issue of ascertaining the angle $\theta$ of the laser stripe relative to the target object.

Within the range of precision of measurement achieved with the embodiment illustrated in FIG. 1*a*, the speed of the motor 1603 may be assumed to be constant. With this assumption, the angular velocity of the motor 1603 and, in turn, the angular velocity of the scanning mirror 1601, may be calculated by analyzing the video data recorded by the video camera 1604. As the first step in calculating the angular velocity, a computer simply compares a sequence of stored video frames to find those frames in which the laser stripes are at identical positions. Based on the number of intervening frames between the two substantially identical video frames, the computer can calculate the angular velocity of the motor 1603 and the scanning mirror 1601. For example, if recorded video frames 7 and 100 are found to be substantially identical and the camera used to record these video frames is an NTSC format camera, then the elapsed time between these frames is 93×(1/30) seconds=3.1 seconds. Furthermore, assuming an 8-faceted polygonal mirror is utilized as the scanning mirror, the angle between two successive, identical scanning positions is 360/8=45 degrees. Accordingly, the rotational speed of the motor and the mirror may be calculated to be ((360/45)×3.1 seconds) per revolution=24.8 seconds per revolution, or, 1 revolution per ((60 seconds/minute)/24.8 seconds)=2.42 rpm.

Using the calculated rotational speed of the motor 1603, the computer can calculate the angular position $\phi$ of the motor with respect to a chosen reference point, and hence the angle $\theta$ of the given mirror facet indicating the angle of approach of the laser stripe relative to the object for a given laser-stripe position on the target object, at any given time if at least one reference angular position, $\phi_0$, of the motor 1603 at a corresponding reference time, e.g., t=0, is known. Using the above example of an 8-faceted polygonal mirror having the rotational speed of 2.42 rpm, if the angular position $\phi$ of the motor was 46 degrees from a predetermined reference line at t=0 second, then the angular position $\phi$ of the motor at t=3 seconds will be 46+((3 seconds)×(360 degrees/1 revolution)×(2.42 revolution/60 seconds))=89.56 degrees. The value of the angle $\theta$ at time t=0 may be calculated from the value of $\phi_0$ because the orientation of each facet of the mirror 1601 relative to the angular position of the motor is known from the calibration procedure described in the "High Accuracy Calibration for 3D Scanning and Measuring Systems" application incorporated herein by reference. Since the value of the angle $\theta$ at any given time may be calculated based on $\omega$, the rotational velocity of the motor 1603, and the value of the angle $\theta$ at time t=0, the computer can associate the two-dimensional coordinate points recorded in the video image frames with the corresponding angle $\theta$ of the laser stripe to calculate the depth component of the 3D profile of the scanned portion of the target object.

With respect to the embodiment of the portable scanning system illustrated in FIG. 1a, it is not possible to ascertain the reference angle $\phi_0$ corresponding to time t=0 because no mechanism for indicating the angular position of the motor 1603 is provided. Accordingly, it is difficult to make absolute size measurements using the embodiment of the scanning system shown in FIG. 1a. However, if the main purpose of the scanning system is to obtain a 3D image of an object without obtaining absolute size measurements, then the computer may be programmed to make an estimation of the reference angle $\phi_0$ at time t=0. For example, if the scanned object is substantially symmetric, e.g., a human face, then the computer may implement an optimization program with the angle $\phi_0$ at t=0 as a parameter to find the angular position of $\phi$ for which the object looks symmetric. In addition, for certain applications, e.g., scanning human faces for subsequent incorporation of 3D images into a computer game or a page on the World Wide Web, high precision in finding the angle $\phi_0$ at t=0 may not be very important. In this case, the angle $\phi_0$ may be manually "adjusted" by means of a 3-D editor, i.e., by performing graphic manipulation.

Figure 2A:
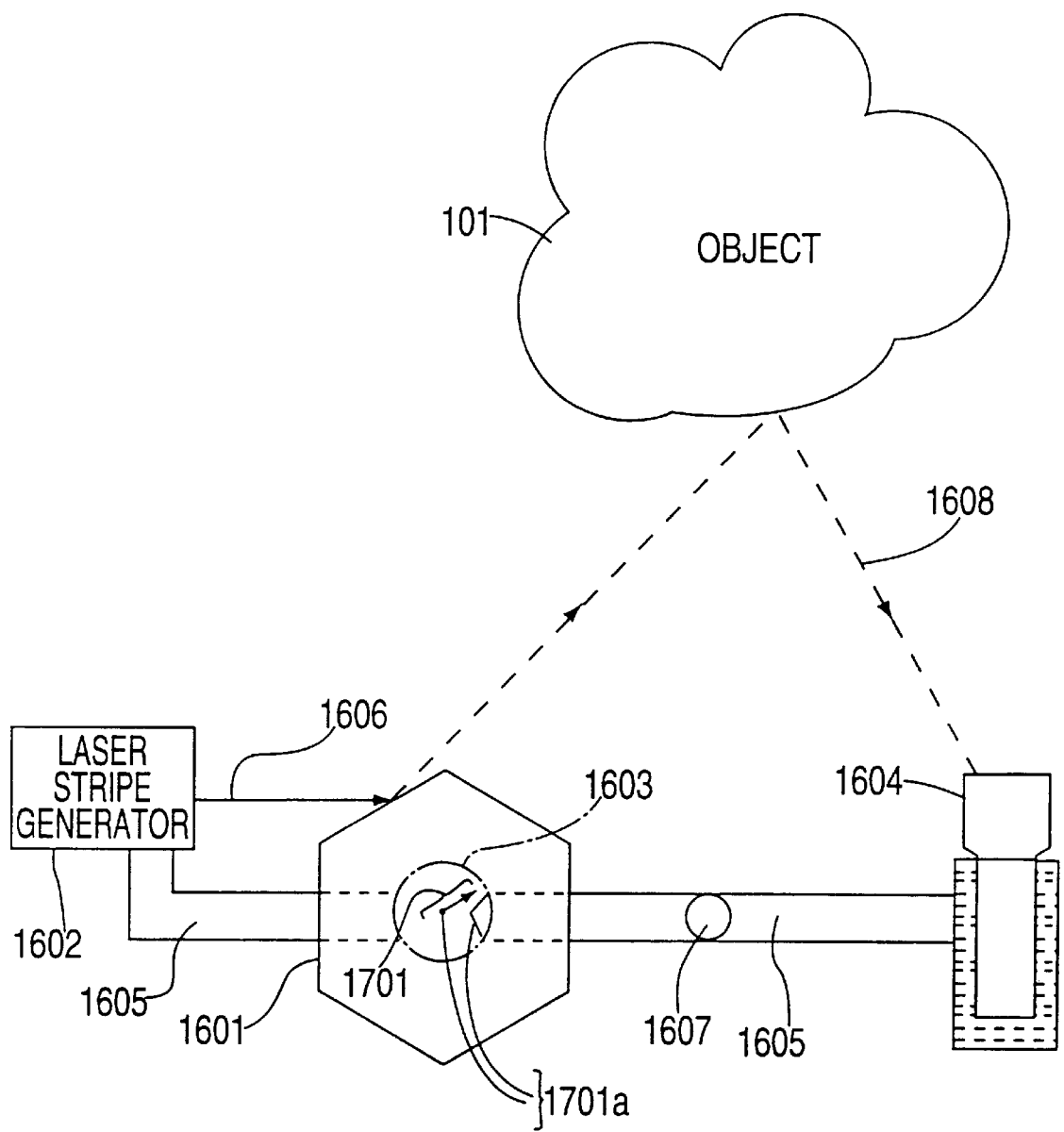
FIG. 2a illustrates a second exemplary embodiment of the portable scanning system according to the present invention which includes a mechanical switch or an encoder.

Illustrated in FIG. 2a is another exemplary embodiment of the portable scanning system according to the present invention, which embodiment provides an angular position value $\phi_0$ for the motor 1603 at time t=0. The embodiment illustrated in FIG. 2a is substantially identical to the embodiment of FIG. 1a, with the addition of a pulse-generating mechanism 1701. The pulse-generating mechanism 1701, which may be a mechanical switch or a low-resolution encoder, is used to provide one or several pulses per rotation of the motor 1603. Each pulse corresponds to a reference angle. The pulses may be fed via connection 1701a to, and recorded on, a separate recording medium, which is not shown, and subsequently processed with the recorded video image frames containing laser-stripe images. For example, the video camera may be adapted to include digital memory for the purpose of storing the encoder pulses. Alternatively, the pulses, along with the video data, may be fed directly to a computer. When the pulses and the video data are processed by the computer, the computer zeroes the time counter at each occurrence of the pulse, thereby synchronizing the recorded video image frames with corresponding angular positions of the motor 1603.

Figure 3:
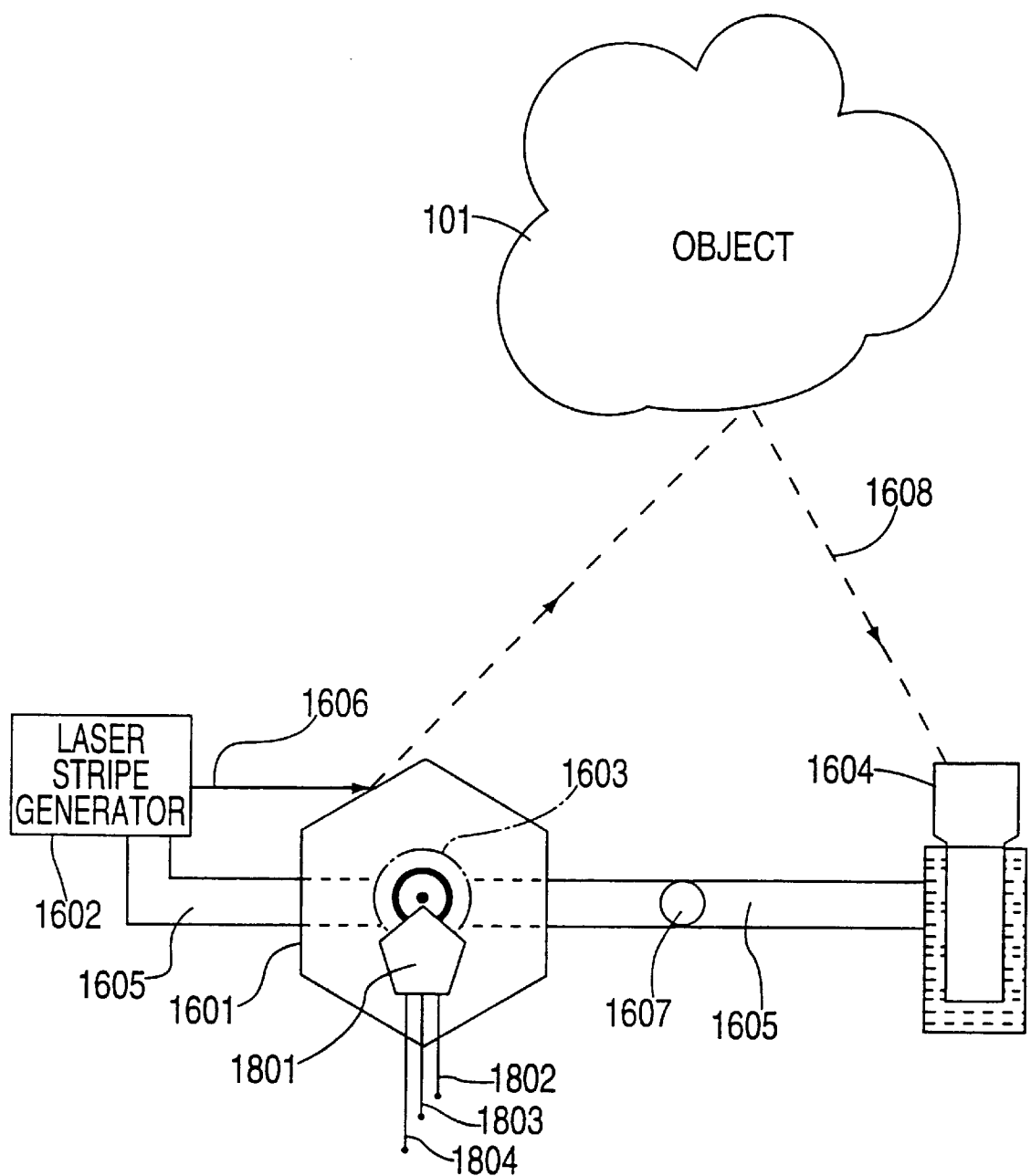
FIG. 3 illustrates a third exemplary embodiment of the portable scanning system according to the present invention which includes an optical encoder.

Shown in FIG. 3 is yet another exemplary embodiment of the portable scanning system according to the present invention, which embodiment provides an angular position $\phi_0$ for the motor 1603 at time t=0, as well as at regular time intervals thereafter, by means of an optical encoder 1801. With the exception of the optical encoder 1801, the embodiment of FIG. 18 is substantially identical to the embodiment shown in FIG. 16. The optical encoder 1801 includes a disk ("code wheel") with holes which is attached to the shaft of the motor 1603, one or more light emitting diodes (LEDs), a set of photodetectors and a signal-processing circuit. As the disk rotates with the shaft of the motor 1603, light emitted from the set of LEDs travels through the holes in the disk and is detected by the photodetectors. The signals from the photodetectors are processed by the signal-processing circuit, and the resulting output signals indicating the angular position $\phi$ of the motor 1603 are produced on channels 1802 and 1803, for example. The output signals on channels 1802 and 1803 are square waveforms representing binary numbers; the output signal on channel 1802 is 90 degrees out of phase with the output signal on channel 1803.

Exemplary, low-cost optical encoders which may be incorporated in the exemplary embodiment of FIG. 3 are HEDS/HEDM series of optical encoders made by Hewlett-Packard Co. These encoders provide 360–1024 counts per revolution, as reflected by output signals on the channels 1802 and 1803. HEDS-5540/5640 encoders generate three-channel, digital output, with the output signal on channel 1804 being an index pulse $P_0$ which is generated once for each full rotation of the motor 1603. The output signals on channels 1802–1804 may be recorded on a recording medium or fed directly to a computer. By interpolating between adjacent, recorded counts, the computer can calculate the angular position $\phi$ of the motor 1603 at any given time with high precision. In this manner, the angular positions of the motor 1603 corresponding to the recorded video image frames may be ascertained.

Figure 4A:
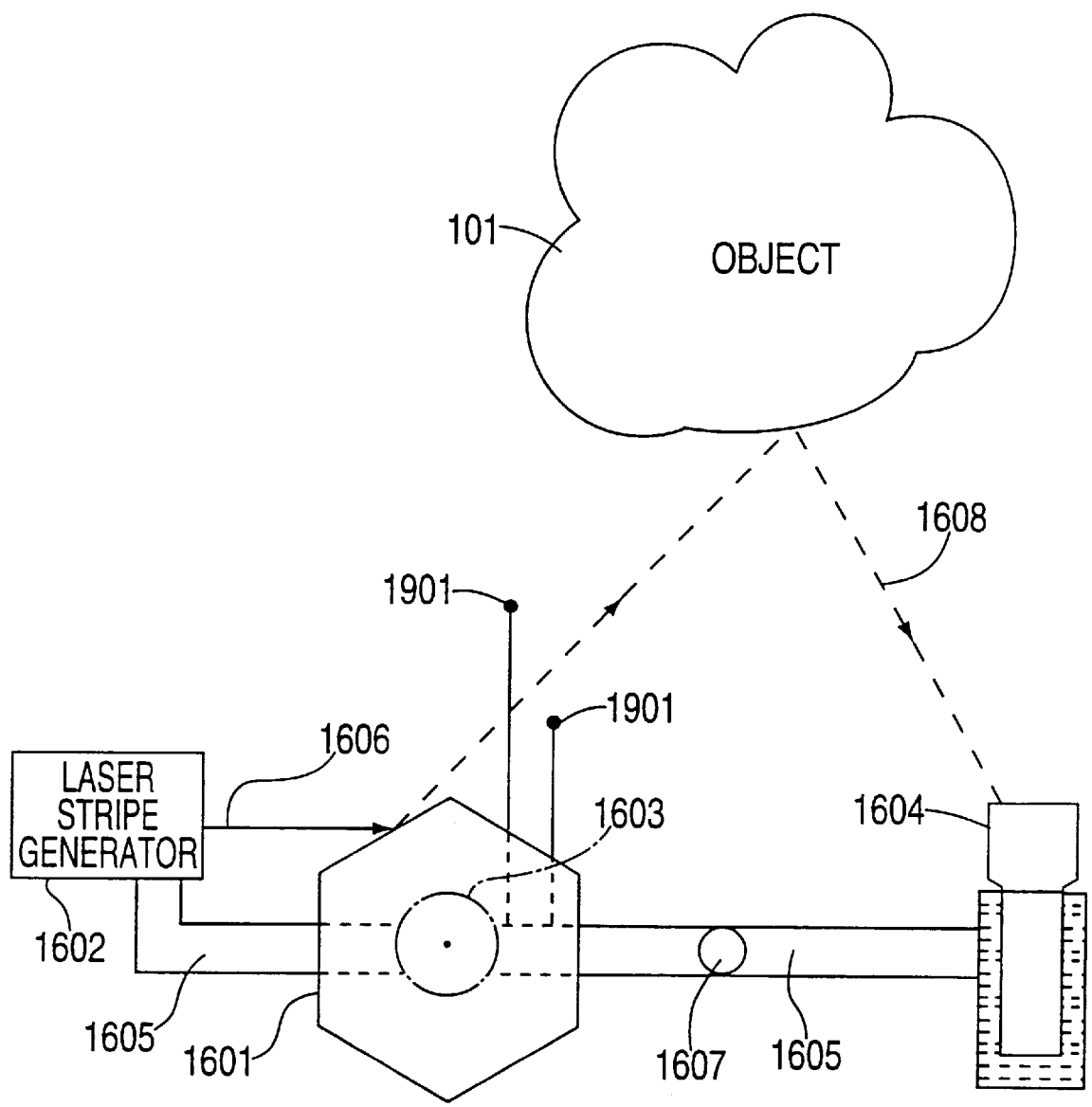
FIG. 4a illustrates a fourth exemplary embodiment of the portable scanning system according to the present invention which includes photodiodes.

As shown in FIG. 4a, yet another exemplary embodiment of the portable scanning system according to the present invention utilizes photodiodes for the purpose of facilitating eventual synchronization between the laser-stripe images recorded as video data and the corresponding angular positions of the motor 1603. The embodiment of FIG. 4a is substantially similar to the embodiment shown in FIG. 16, with the addition of two photodiodes 1901 each located at a known position from the scanning mirror 1601. Alternatively, a single photodiode may be used. As the mirror 1601 rotates, the photodiodes 1901 detect the laser stripe 1606 reflected from the mirror 1601, in response to which the photodiodes 1901 generate detection signals. For each photodiode 1901, the detection signal indicates orientation of the scanning mirror 1601 at the particular known angle relative to the photodiode. The detection signals may be recorded on a recording medium or fed directly to a computer. By combining the recorded laser-stripe images with the time sequence of corresponding detection signals, the angle θ of the scanning mirror 1601 relative to the target object corresponding to a given laser-stripe image may be ascertained.

Figure 5:
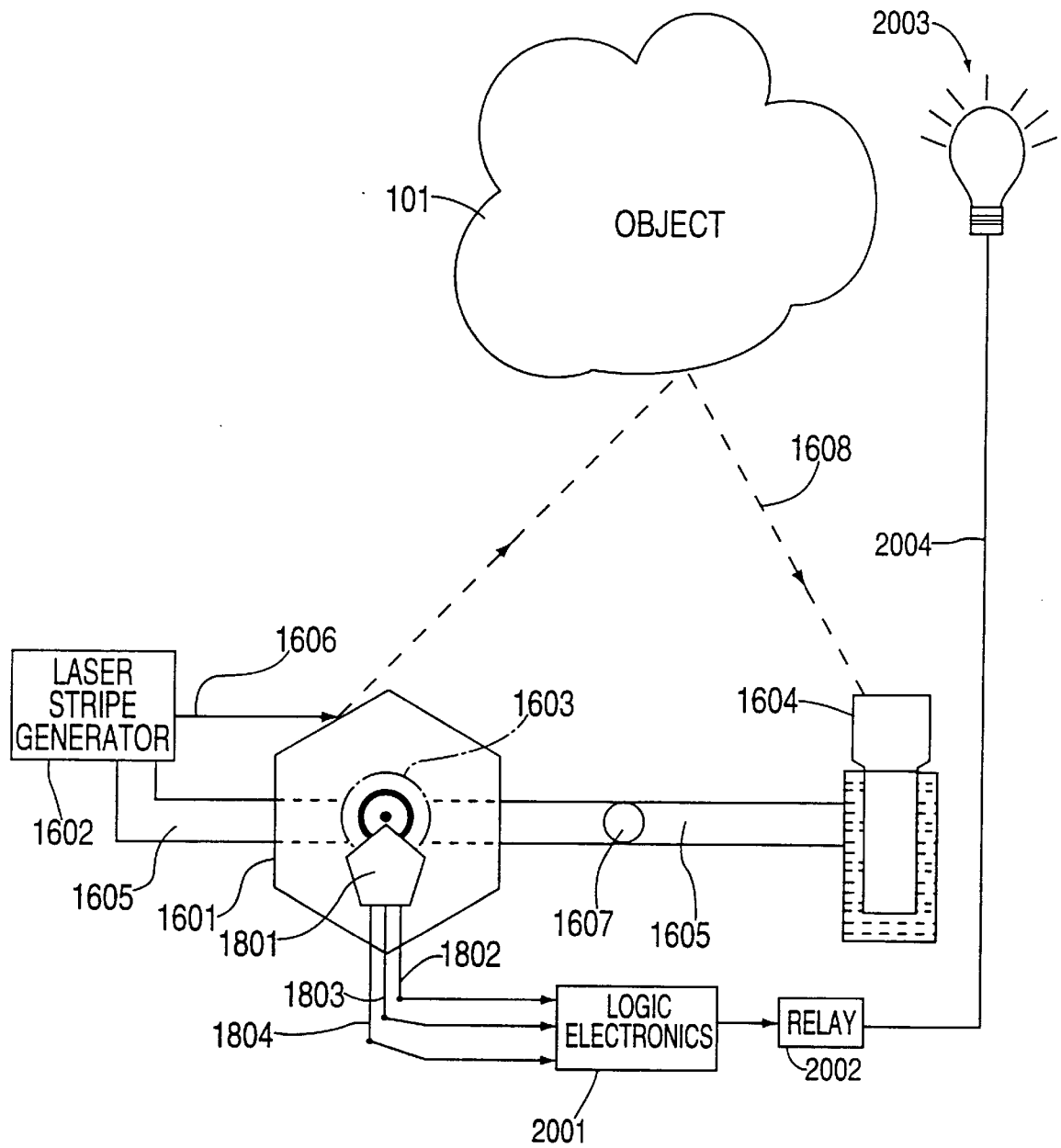
FIG. 5 illustrates a fifth exemplary embodiment of the portable scanning system according to the present invention which includes logic electronics and a lamp.

Still another exemplary embodiment of the portable scanning system according to the present invention, shown in FIG. 5, is substantially similar to the embodiment of FIG. 3, with the addition of logic electronics 2001, a relay 2002 and a lamp 2003. The logic electronics 2001 triggers the lamp 2003 in response to the output signal of the encoder 1801 when the motor 1603 reaches one or more predetermined reference angle(s). Since the lamp 2003 turns on only at specific angular positions of the motor 1603, the angular position φ of the motor corresponding to a given image frame may be ascertained by comparing total brightness of adjacent recorded image frames, i.e., determining when the lamp 2003 is turned on. Based on the angular position of the motor corresponding to an image frame in which the lamp 2003 was turned on, the computer can then calculate the angular position φ of the motor for any other recorded image frame.

Figure 2B:
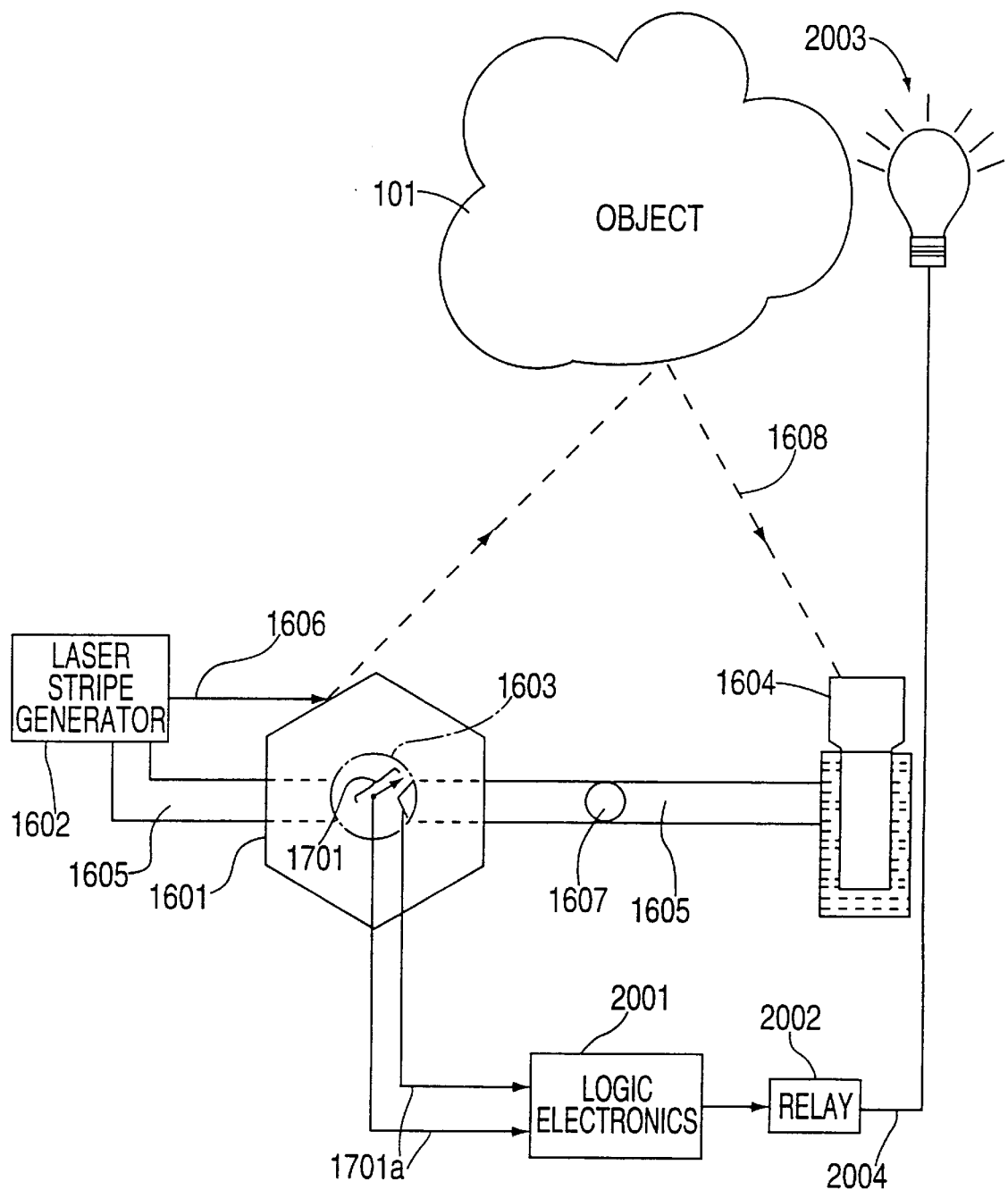
FIG. 2b illustrates a modification of the second exemplary embodiment of the portable scanning system according to the present invention shown in FIG. 2a, which modification adds a logic electronics and a lamp.
Figure 4B:
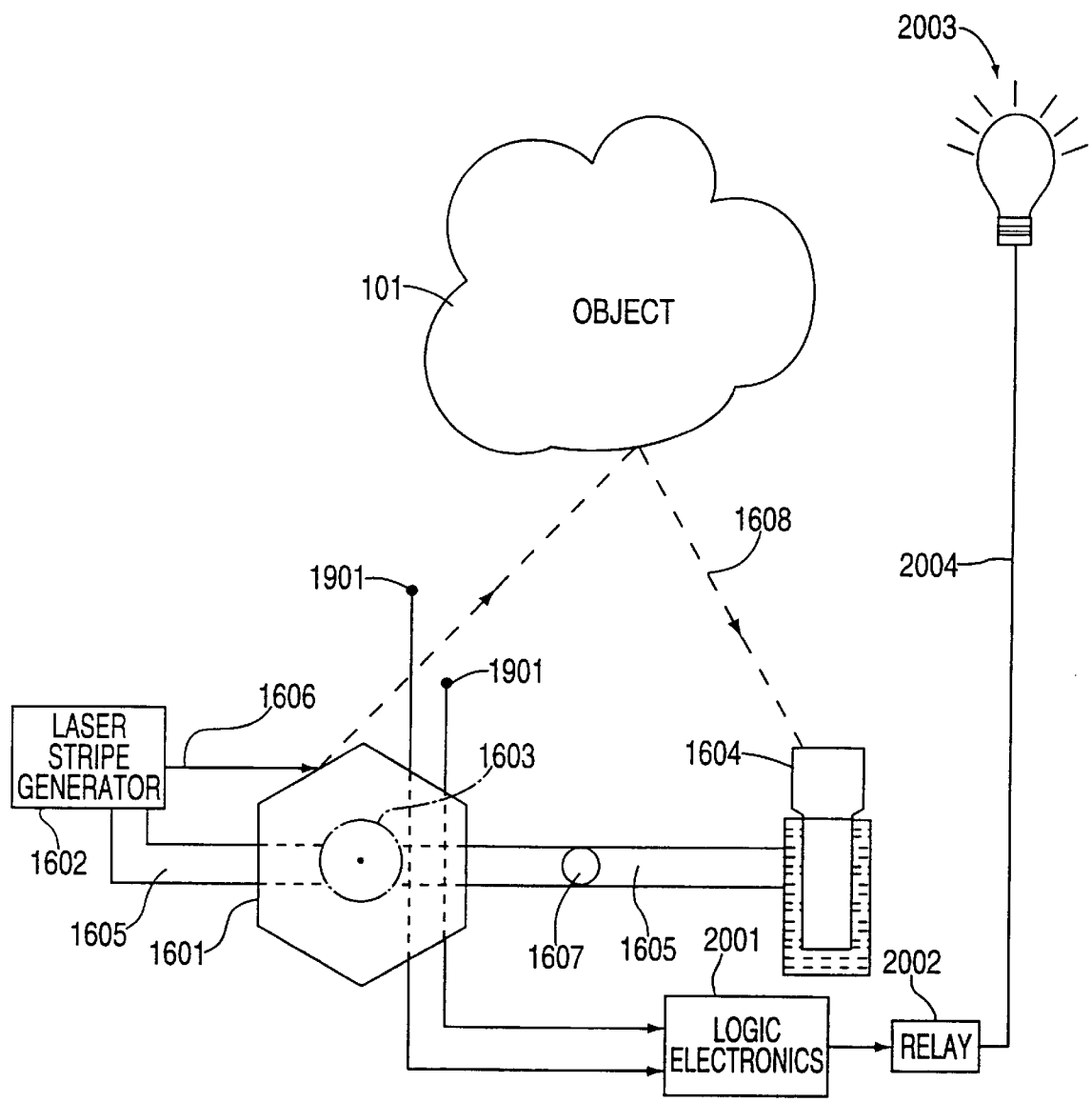
FIG. 4b illustrates a modification of the fourth exemplary embodiment of the portable scanning system according to the present invention shown in FIG. 4a, which modification adds a logic electronics and a lamp.

Although FIG. 5 shows the output signal of the encoder 1801, transmitted via channels 1802–1804, as the input signal for the logic electronics 2001, the logic electronics 2001 may be designed to trigger the lamp 2003 in response to other input signals which indicate that the motor 1603 has reached a predetermined reference angle. For example, output signals from the mechanical switch 1701, shown in FIG. 2a, or signals from the photodiodes 1901, shown in FIG. 4a, may serve as the input signals for the logic electronics 2001, i.e., the embodiments of FIGS. 2a and 4a may be modified by adding the logic electronics 2001, the relay 2002 and the lamp 2003. These alternative embodiments are illustrated in FIGS. 2b and 4b.

In the exemplary embodiment of FIG. 5, the lamp 2003 also serves the function of providing light for taking texture-map image, in addition to the function of generating information about the angular position of the motor. The lamp 2003 is useful for the purpose of taking texture-map image because increased uniformity of illumination of the scanned object is desirable. Meanwhile, because the dynamic range of commercially available video cameras is limited, i.e., 256 gradations of gray for a typical low-cost camera, reduced background illumination relative to the object illumination usually results in a more efficient 3D scanning process.

Figure 6:
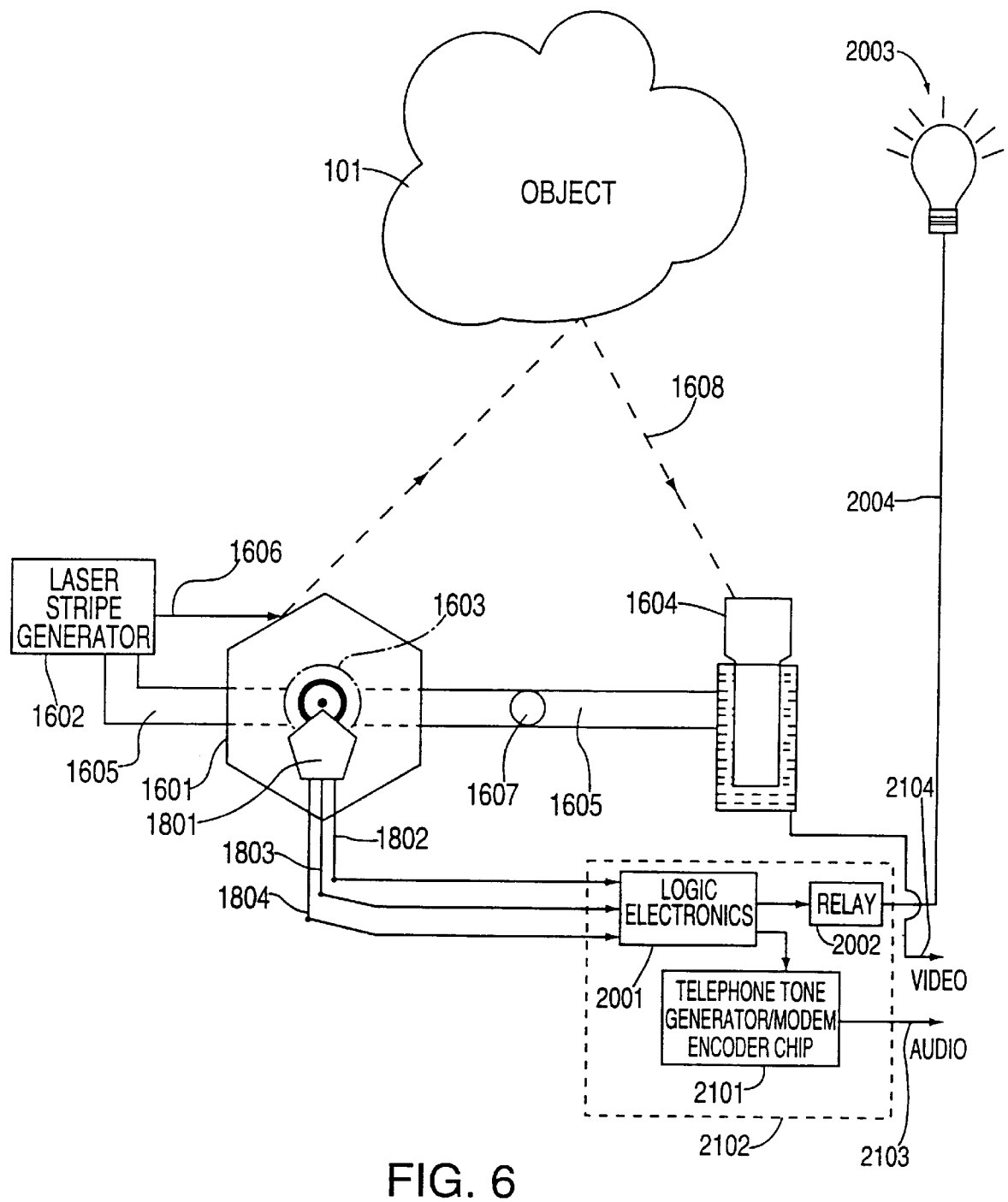
FIG. 6 illustrates a sixth exemplary embodiment of the portable scanning system according to the present invention which implements angular data encoding by utilizing a telephone tone generator or a modem encoder chip.

Shown in FIG. 6 is yet another exemplary embodiment of the portable scanning system according to the present invention, which system records the angular positions of the motor 1603 preferably in audio format. The exemplary embodiment of FIG. 6 includes substantially similar components as the exemplary embodiment of FIG. 5, with the addition of an audio-signal generator 2101. The angular positions of the motor 1603 may be encoded into audio type electrical signals by the audio-signal generator 2101, which may be a telephone tone generator or a modem encoder chip.

For example, the telephone tone generator, used in modern touch-tone telephones, generates audio type electrical signals by mixing two electrical signals of different frequencies. The bandwidth of the resultant signal falls well within the telephone signal bandwidth of 4 kHz.

As shown in FIG. 6, the logic electronics 2001 triggers the telephone tone generator or the modem encoder chip 2101 in response to the output of the optical encoder 1801 transmitted via output channels 1802–1804, such that every count generated by the optical encoder 1801 is represented by a sequence of telephone tone pulses. The logic electronics 2001 and the telephone tone generator (or the modem encoder chip) 2101 may be viewed as components of audio electronics 2102. The logic electronics 2001 includes a quartz generator for triggering the tone generator or the modem encoder chip 2101. Assuming the optical encoder 1801 generates 360 counts per revolution, for example, then the modem encoder chip 2101 needs to encode 360 different numbers, which means using as many as three bits of the modem encoder chip 2101 for encoding the value of a single angle. The quartz generator provides timing signal for outputting the multiple bits of the modem encoder chip 2101. Assuming the motor 1603 has an angular velocity of 2–4 rpm and the optical encoder 1801 generates 360 counts per revolution, any commonly used telephone tone generator will be sufficient for the purposes of encoding angular positions of the motor 1603.

Although FIG. 6 shows the output signal of the encoder 1801, transmitted via channels 1802–1804, as the input signal for the logic electronics 2001, the logic electronics 2001 may be designed to trigger the tone generator 2101 in response to other input signals which indicate that the motor 1603 has reached one or more predetermined reference angles. For example, output signals from the mechanical switch 1701, shown in FIG. 2a, or signals from the photodiodes 1901, shown in FIG. 4a, may serve as the input signals for the logic electronics 2001, i.e., the embodiments of FIGS. 2a and 4a may be modified by adding the logic electronics 2001 and the tone generator 2101. These alternative embodiments are illustrated in FIGS. 2c and 4c.

Figure 2C:
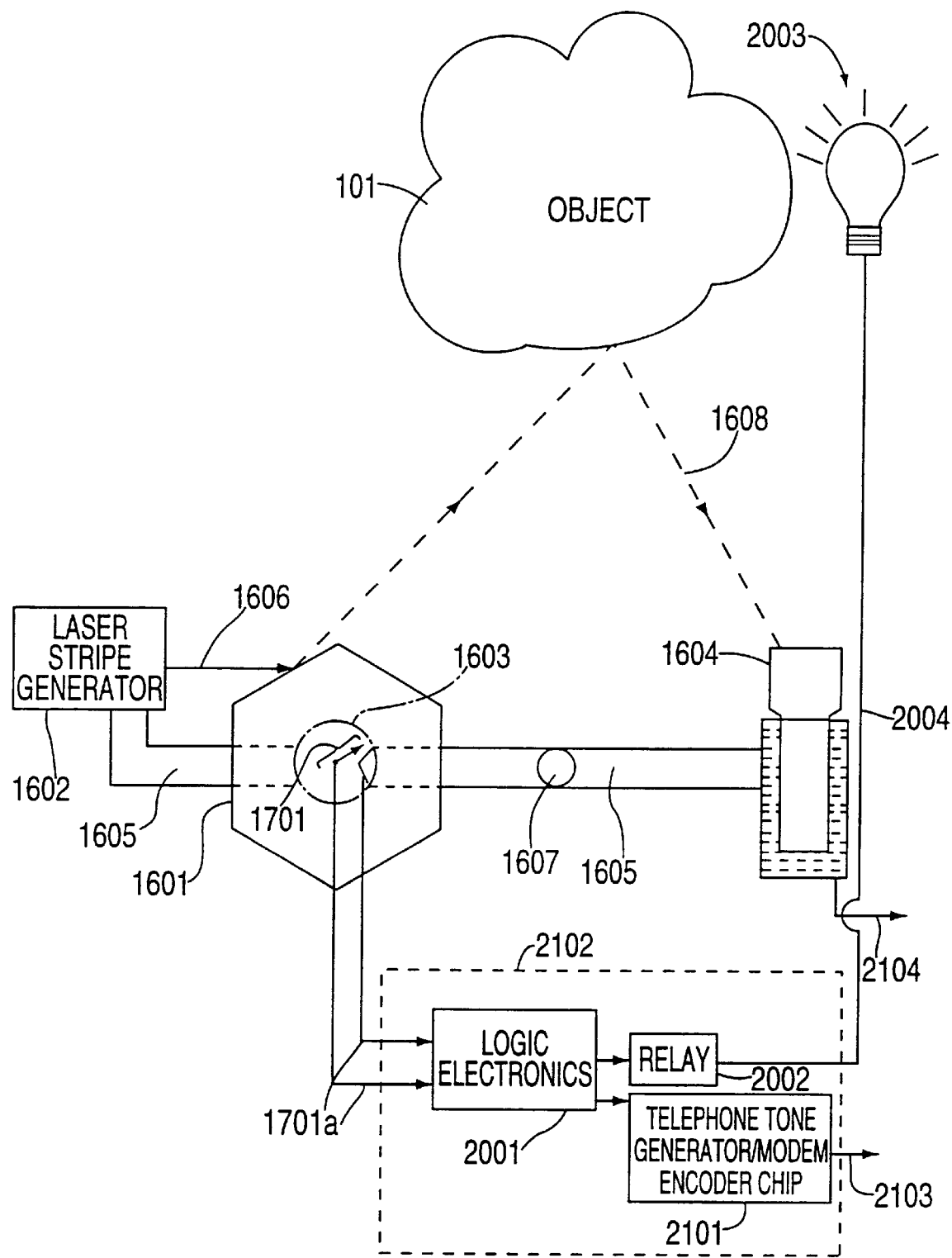
FIG. 2c illustrates a modification of the second exemplary embodiment of the portable scanning system according to the present invention shown in FIG. 2a, which modification adds a logic electronics and a telephone tone generator or a modem encoder chip.
Figure 4C:
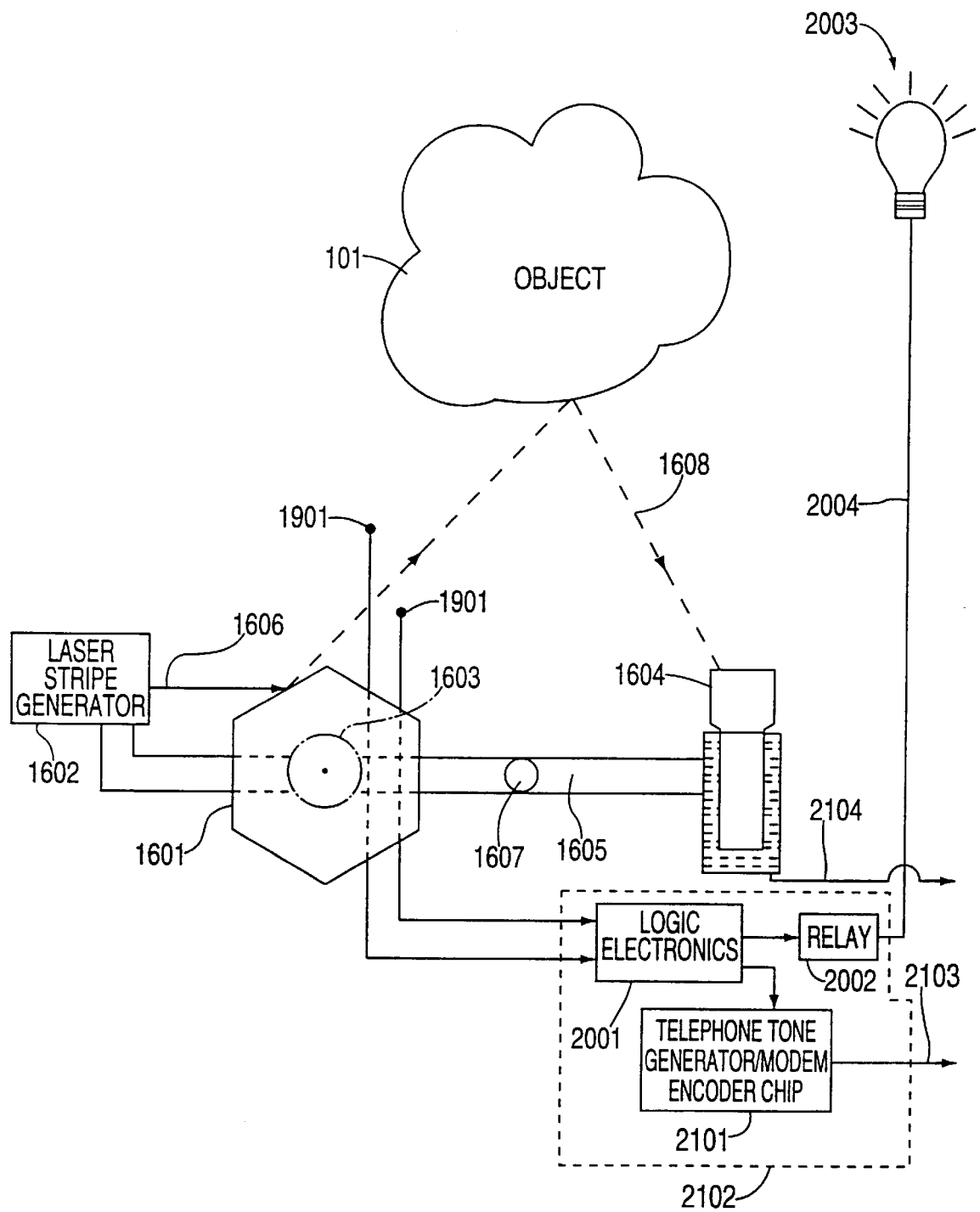
FIG. 4c illustrates a modification of the fourth exemplary embodiment of the portable scanning system according to the present invention shown in FIG. 4a, which modification adds a logic electronics and a telephone tone generator or a modem encoder chip.

In the exemplary embodiment shown in FIG. 6, as well as in the embodiments shown in FIGS. 2c and 4c, the lamp 2003 is an optional component of the scanning system. In these embodiments, the lamp 2003 is utilized to enhance the illumination of the target object for taking texture-map image. The illumination provided by the lamp 2003 reduces the probability that the recorded images frames of the scanned object are too dark, or the probability that the computer processing the recorded image frames will have problems in identifying the laser stripe positioned on the scanned object from bright background.

Figure 7:
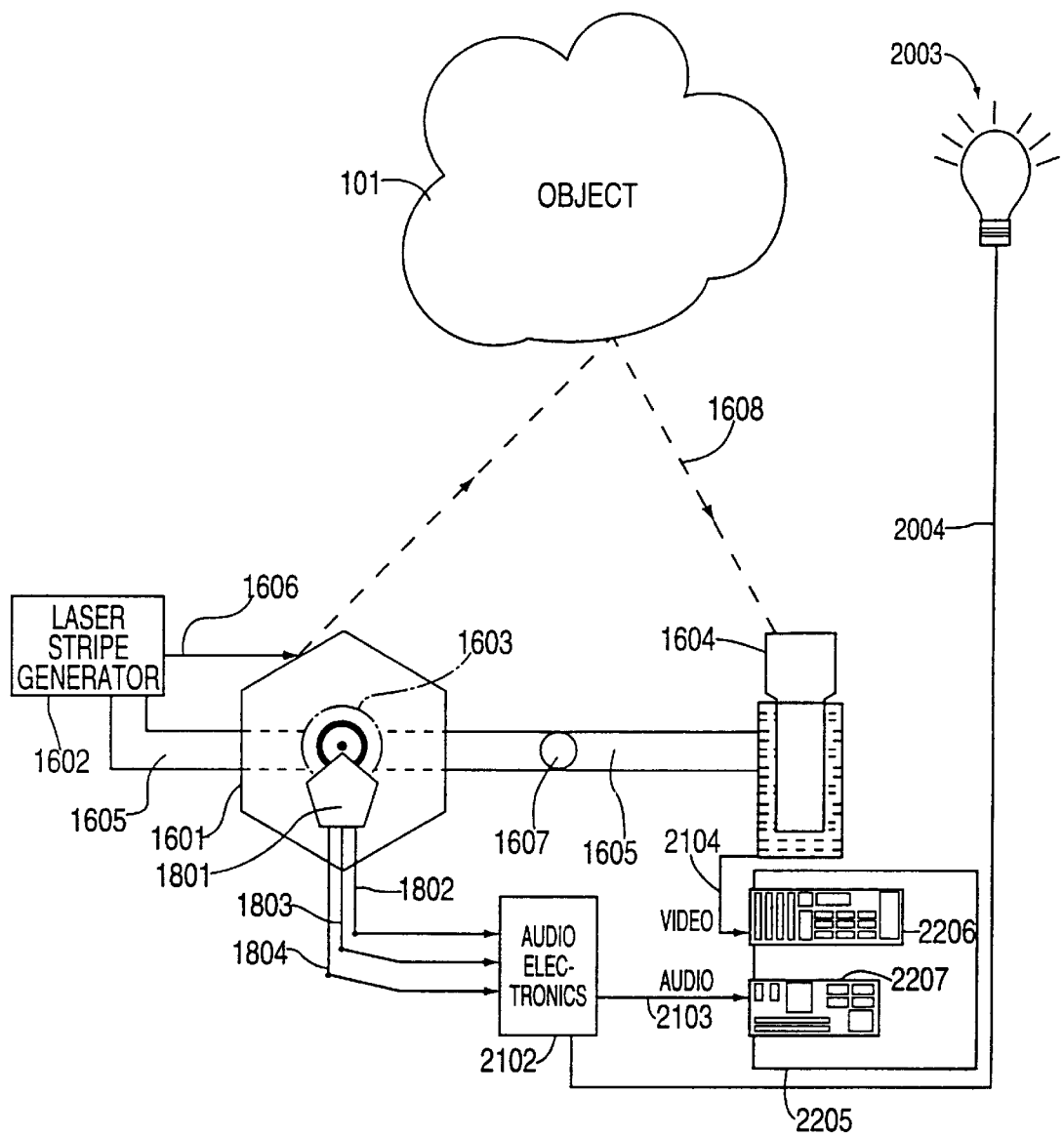
FIG. 7 illustrates the sixth exemplary embodiment of the portable scanning system shown in FIG. 6 connected to audio and video signal interfaces of a computer.
Figure 8:
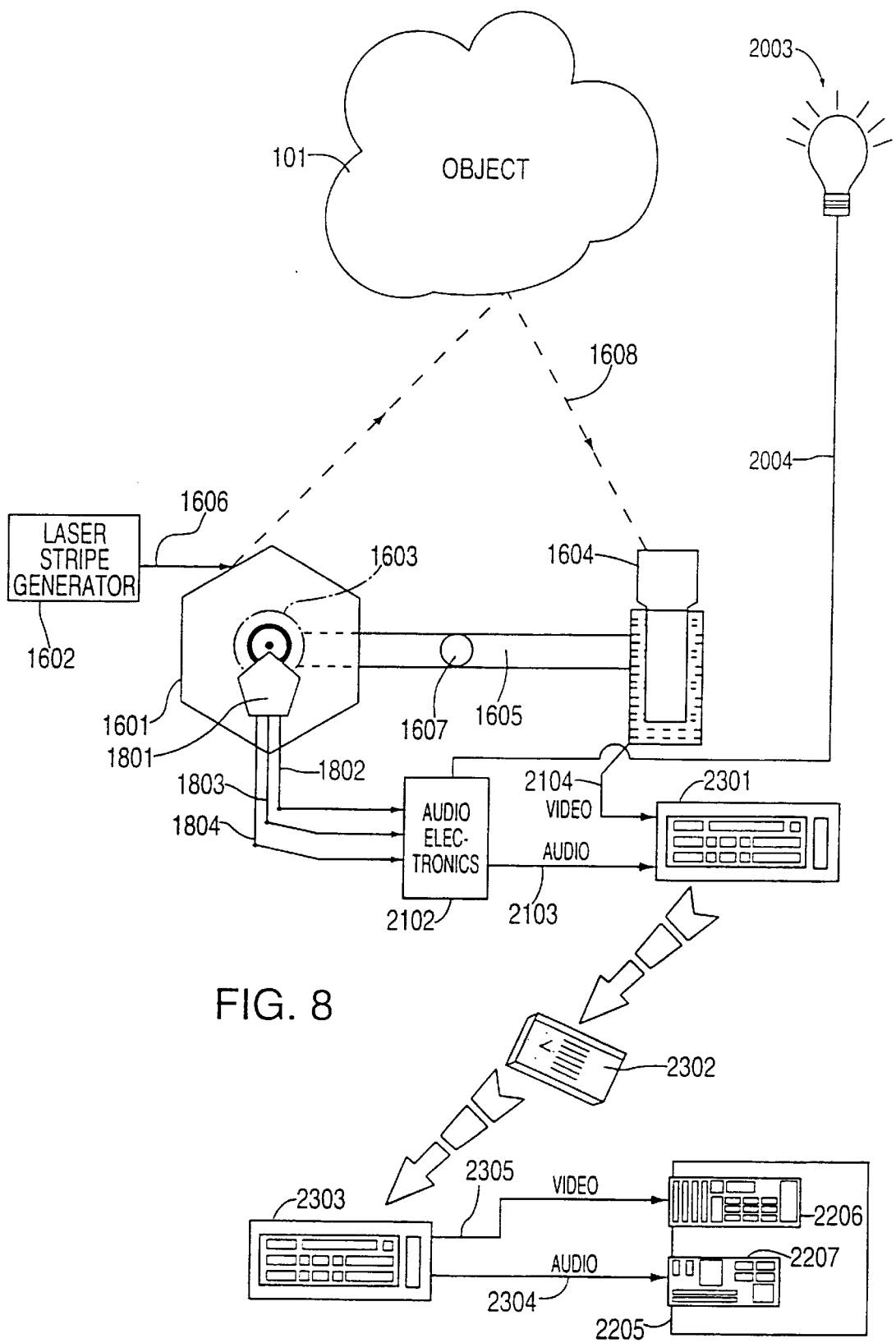
FIG. 8 illustrates the use of an intermediate storage medium to store 3D-profile data captured using the sixth exemplary embodiment of the portable scanning system according to the present invention shown in FIG. 6.

The video image frames from the video camera 1604 and the audio signals from the audio electronics 2102 may be fed directly to a computer 2205, as shown in FIG. 7, or recorded on a storage medium and processed later by a computer, as shown in FIG. 8. As shown in FIG. 7, the video signals representing the captured image frames are fed from the video camera 1604 via channel 2104 to a video capture device 2206 of the computer 2205. Similarly, the audio signals representing the angular positions of the motor 1603 are fed from the audio electronics 2102 via channel 2103 to an audio capture device 2207 of the computer 2205. For a PC type computer, the video capture device 2206 is a plug-in frame grabber board, while the audio capture device 2207 is an input terminal of a sound board.

For modern PC type computers having a PCI type internal bus, video frame gabbers capable of capturing NTSC format video images with 640×480 pixels resolution at a rate of 30 frames (60 fields) per second are readily available. For example, Meteor™ video frame grabber board manufactured by Matrox, Inc. takes advantage of high bandwidth of the PCI bus by transferring the video data directly to the main processor/memory of the computer without buffering it on the board. Since the main processor of a typical PC type computer is capable of directly processing the captured video data in order to determine the recorded laser stripe image and perform the triangulation calculation, no additional buffering of data is necessary for performing the triangulation calculation and determining the 3D coordinates representing the profile of the scanned object.

Because the sound boards of modern PC type computers typically have a 16-bit resolution and a bandwidth much higher than the bandwidth of the telephone tone generator incorporated in the audio electronics 2102, such sound boards are very well suited for handling audio data representing the angular positions of the motor 1603. Furthermore, due to its limited bandwidth, these sound boards consume just a small fraction of the bus and processor time.

As shown in FIG. 8, video image frames from the camera 1604 and audio signals representing the angular positions of the motor 1603 may be recorded on a storage medium 2302 by means of a recording device 2301. In FIG. 8, the storage medium 2302 is, for example, a cassette tape for recording both video and audio signals. A typical camcorder, which is designed to record both video and audio signals, combines the video camera 1604 and the recording device 2301. For example, camcorders manufactured by Sony have an audio input for recording audio signals from an auxiliary microphone. The audio input can be used to record audio signals generated by the audio electronics 2102. The video and audio signals recorded on the storage medium 2302 may be reproduced by means of a VCR 2303, for example, and fed to the video capture device 2206 and the audio capture device 2207, respectively, of the computer 2205. The computer then performs the triangulation calculation and determines the 3D coordinates representing the profile of the scanned object, as well as performing other post-scanning tasks, e.g., data simplification and adaptive-mesh generation.

It should be emphasized that, for each of the embodiments illustrated in FIGS. 1a–8, video image frames containing the images of laser stripes reflected from the scanned object and signals representing the angular positions of the motor 1603 may be recorded on an intermediate storage medium. By utilizing the intermediate storage medium, the exemplary embodiments of the scanning system according to the present invention shown in FIGS. 1a–8 eliminate the need to have a computer present at the scanning site, thereby achieving practical portability and added flexibility in scanning. For the exemplary embodiments of the portable scanning system according to the present invention, the computer is just a passive device used to process the data obtained from the scanning process: the computer need not participate in the data acquisition process.

Although the exemplary embodiments of the portable scanning system according to the present invention shown in FIGS. 1a–8 achieve practical portability and enhanced flexibility of scanning, these embodiments of the portable scanning system do not sacrifice the quality of resulting 3D profile of the scanned object or significantly increase the time required to process the laser-stripe image data and data reflecting the angular positions of the laser stripe. Once the angular positions of the laser stripe corresponding to the recorded laser-stripe images have been ascertained from the recorded audio and/or video data, the computer performs various program routines, e.g., 3D reconstruction, data simplification, mesh generation and stitching, all of which are described in U.S. patent application Ser. No. 08/620,689 filed on Mar. 21, 1996 by A. Migdal, M. Petrov and A. Lebedev, to generate the 3D model of the scanned object. U.S. patent application Ser. No. 08/620,689 is expressly incorporated herein by reference as if fully set forth at length herein.

For each of the exemplary embodiments of the portable scanning system illustrated in FIGS. 1a–8, the calibration procedures for setting the initial scanning parameters are described in detail in "High Accuracy Calibration for 3D Scanning and Measuring Systems" application, which is filed concurrently with the present application and has been expressly incorporated herein by reference. As previously mentioned, the calibration procedures described in the "High Accuracy Calibration for 3D Scanning and Measuring Systems" application include, among others, calibrations for camera lens distortion and the focal point value d. These calibration procedures are briefly discussed below.

Calibration for camera lens distortion may be accomplished by scanning a flat reference surface with a repeated and evenly spaced pattern of laser lines and capturing the image of these laser lines. Alternatively, a frame grabber associated with a computer may be used to collect from the camera 1604 the image of a rectilinear grid pattern drawn on a flat surface. If the image of the rectilinear grid pattern is used for calibration, for example, since the lines forming the rectilinear grid are known to be straight, the deviation between the captured image of the grid lines and the actual grid lines may be used to generate a correction matrix.

Referring to FIG. 1b, the focal point value d of the camera 1604 may be ascertained by one of several different calibration procedures. One calibration procedure involves capturing the image of a flat reference surface on which an equilateral triangle of known dimensions is drawn. When the image of the triangle is captured, each of the three vertices generates a corresponding image point on the camera image plane 1604b, and the imaginary line connecting the vertex of the triangle on the flat reference surface and the corresponding image point on the camera image plane may be expressed as a line equation. By simultaneously solving three line equations corresponding to the three vertices of the equilateral triangle, the focal distance d may be ascertained.

In addition to the calibration for the camera lens distortion and the camera focal distance d shown in FIG. 1b, the portable scanning system according to the present invention is calibrated for the following parameters: relative positions of the image collector and the light source (the $X_L$ and $Z_L$ settings); and, for each facet of the multi-faceted mirror 1601, an initial (or reference) mirror angle $\theta_o$ corresponding to a known motor position. The initial mirror angle $\theta_o$ indicates the orientation of a given mirror facet relative to the motor position. The calibration procedures for the $X_L$, $Z_L$ and $\theta_o$ parameters are described in detail in "High Accuracy Calibration for 3D Scanning and Measuring Systems" application.

While the present invention has been described in connection with specific embodiments, it should be understood that these embodiments are exemplary in nature and not to be construed as limiting the scope of protection for the invention as set forth in the appended claims, as certain changes may be made to the exemplary embodiments without departing from the clear teachings of the present invention. For example, although the preferred embodiments utilize the multi-faceted mirror 1601 to reflect and variably position the laser stripe across a target object, other laser-stripe positioning devices such as a holographic disc may be utilized. Accordingly, reference should be made to the following claims which alone define the invention.

We claim:

1. A portable system for determining a three-dimensional profile of an object comprising:
   a light-source unit for projecting a stripe of light onto said object and creating a luminous contour line at an intersection of said stripe of light and said object, said light-source unit being adapted to variably position said stripe of light onto said object;
   an image-detecting device for detecting a sequence of images each containing at least one image of luminous contour line, said image-detecting device producing for each image signals representative of said each image, including signals representative of two-dimensional coordinates of detected contour line, wherein said image-detecting device is one of a TV camera, a video camera and a CCD camera;
   an angle indicator for generating a signal related to an angle of approach of said stripe of light onto said object for at least one position of said stripe of light on said object; and
   at least one data storage for storing at least one of pulse signals, audio signals and video signals, wherein said signals representative of said each image are stored as video signals and one of said signal related to said angle of approach of said stripe of light onto said object for said at least one position of said stripe of light on said object and a signal derived from said signal related to said angle of approach of said stripe of light is stored as one of a pulse signal, an audio signal and a video signal.

2. The system according to claim 1 wherein said light-source unit comprises a light-stripe generator and a light-stripe positioner for variably deflecting said stripe of light onto said object, and wherein said signals representative of said each image are stored on a video storage medium, and one of said signal related to said angle of approach of said stripe of light onto said object for said at least one position of said stripe of light on said object and a signal derived from said signal related to said angle of approach of said stripe of light is stored on one of a digital storage medium, an audio storage medium and a video storage medium.

3. The system according to claim 2 wherein said light-stripe positioner comprises a mirror rotatingly driven by a motor.

4. The system according to claim 3 wherein said image-capturing device is located relative to said rotating mirror at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined.

5. The system according to claim 4 wherein said stored signals are subsequently processed by a data-processing apparatus to determine said plurality of three-dimensional coordinates representative of said three-dimensional profile of said object.

6. The system according to claim 5 wherein said rotating mirror comprises a multi-faceted mirror rotatingly driven by said motor at a known angular velocity, and wherein said angle of approach of said stripe of light onto said object corresponding to each detected contour line is calculable based on said known angular velocity of said motor and said stored signal related to said angle of approach of said stripe of light onto said object for said at least one position of said stripe of light on said object.

7. The system according to claim 6 wherein said angle indicator comprises a pulse-generator for providing at least one pulse per one rotation of said motor, said at least one pulse corresponding to a known angular position of said motor, and wherein an angle of approach of said stripe of light onto said object at any given time is calculable based on said known angular position of said motor and time of occurrence of said at least one pulse corresponding to said known angular position of said motor.

8. The system according to claim 7 further comprising:
   an audio-signal generator operationally coupled to said at least one pulse corresponding to said known angular position of said motor, said audio-signal generator generating an audio signal indicative of time of occurrence of said at least one pulse corresponding to said known angular position of said motor;
   wherein said time of occurrence of said at least one pulse corresponding to said known angular position of said motor is ascertainable based on said audio signal.

9. The system according to claim 8 wherein said audio-signal generator comprises a telephone tone generator.

10. The system according to claim 8 wherein said audio-signal generator comprises a modem encoder chip.

11. The system according to claim 6 wherein said angle indicator comprises an optical encoder for providing a plurality of signals per one rotation of said motor, said plurality of signals corresponding to known angular positions of said motor, and wherein an angle of approach of said stripe of light onto said object at any given time is calculable based on said known angular positions of said motor and respective times of occurrence of said plurality of signals corresponding to said known angular positions of said motor.

12. The system according to claim 11 further comprising:
   an audio-signal generator operationally coupled to said plurality of signals corresponding to said known angular positions of said motor, said audio-signal generator generating a plurality of audio signals corresponding to said plurality of signals corresponding to said known angular positions of said motor;
   wherein respective times of occurrence of said plurality of signals corresponding to said known angular positions of said motor are ascertainable based on said audio signals.

13. The system according to claim 12 wherein said audio-signal generator comprises a telephone tone generator.

14. The system according to claim 12 wherein said audio-signal generator comprises a digital encoder.

15. The system according to claim 6 wherein said angle indicator comprises a photodiode for providing at least one signal per one rotation of said motor, said at least one signal corresponding to a known angular position of said motor, and wherein an angle of approach of said stripe of light onto said object at any given time is calculable based on said known angular position of said motor and time of occurrence of said at least one signal corresponding to said known angular position of said motor.

16. The system according to claim 2 wherein said light-stripe positioner comprises a holographic disc rotatingly driven by a motor.

17. The system according to claim 16 wherein said image-capturing device is located relative to said rotating holographic disc at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined.

18. The system according to claim 17 wherein said stored signals are subsequently processed by a data-processing apparatus to determine said plurality of three-dimensional coordinates representative of said three-dimensional profile of said object.

19. The system according to claim 18 wherein said holographic disc is rotatingly driven by said motor at a known angular velocity, and wherein said angle of approach of said stripe of light onto said object corresponding to each detected contour line is calculable based on said known angular velocity of said motor and said stored signal related to said angle of approach of said stripe of light onto said object for said at least one position of said stripe of light on said object.

20. The system according to claim 19 wherein said angle indicator comprises a pulse-generator for providing at least one pulse per one rotation of said motor, said at least one pulse corresponding to a known angular position of said motor, and wherein an angle of approach of said stripe of light onto said object at any given time is calculable based on said known angular position of said motor and time of occurrence of said at least one pulse corresponding to said known angular position of said motor.

21. The system according to claim 20 further comprising:
an audio-signal generator operationally coupled to said at least one pulse corresponding to said known angular position of said motor, said audio-signal generator generating an audio signal indicative of time of occurrence of said at least one pulse corresponding to said known angular position of said motor;
wherein said time of occurrence of said at least one pulse corresponding to said known angular position of said motor is ascertainable based on said audio signal.

22. The system according to claim 21 wherein said audio-signal generator comprises a telephone tone generator.

23. The system according to claim 21 wherein said audio-signal generator comprises a digital encoder.

24. The system according to claim 19 wherein said angle indicator comprises an optical encoder for providing a plurality of signals per one rotation of said motor, said plurality of signals corresponding to known angular positions of said motor, and wherein an angle of approach of said stripe of light onto said object at any given time is calculable based on said known angular positions of said motor and respective times of occurrence of said plurality of signals corresponding to said known angular positions of said motor.

25. The system according to claim 24 further comprising:
an audio-signal generator operationally coupled to said plurality of signals corresponding to said known angular positions of said motor, said audio-signal generator generating a plurality of audio signals corresponding to said plurality of signals corresponding to said known angular positions of said motor;
wherein respective times of occurrence of said plurality of signals corresponding to said known angular positions of said motor are ascertainable based on said audio signals.

26. The system according to claim 25 wherein said audio-signal generator comprises a telephone tone generator.

27. The system according to claim 25 wherein said audio-signal generator comprises a digital encoder.

28. The system according to claim 19 wherein said angle indicator comprises a photodiode for providing at least one signal per one rotation of said motor, said at least one signal corresponding to a known angular position of said motor, and wherein an angle of approach of said stripe of light onto said object at any given time is calculable based on said known angular position of said motor and time of occurrence of said at least one signal corresponding to said known angular position of said motor.

29. The system according to claim 28 further comprising:
an audio-signal generator operationally coupled to said at least one signal corresponding to said known angular position of said motor, said audio-signal generator generating an audio signal indicative of time of occurrence of said at least one signal corresponding to said known angular position of said motor;
wherein said time of occurrence of said at least one signal corresponding to said known angular position of said motor is ascertainable based on said audio signal.

30. The system according to claim 29 wherein said audio-signal generator comprises a telephone tone generator.

31. The system according to claim 29 wherein said audio-signal generator comprises a digital encoder.

32. A system for determining a three-dimensional profile of an object comprising:
a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a multi-faceted mirror rotatingly driven by a motor at a known angular velocity for variably deflecting said stripe of light onto said object;
an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said multi-faceted rotating mirror at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;
an angle indicator for generating a signal related to an angle of approach of said stripe of light onto said object for at least one position of said stripe of light on said object, wherein said angle indicator is a pulse-generator for providing at least one pulse per one rotation of said motor, said at least one pulse corresponding to a known angular position of said motor, and wherein an angle of approach of said stripe of light onto said object at any given time is calculable based on said known angular position of said motor and time of occurrence of said at least one pulse corresponding to said known angular position of said motor; and a lamp operationally coupled to said at least one pulse corresponding to said known angular position of said motor, said lamp being turned on during a finite period of time corresponding to said occurrence of said at least one pulse corresponding to said known angular position of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein time of occurrence of said at least one pulse corresponding to said known angular position of said motor is ascertainable based on relative brightness of said detected sequence of images as indicated by said stored signals representative of said detected sequence of images.

33. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a multi-faceted mirror rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said multi-faceted rotating mirror at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is an optical encoder for providing a plurality of signals per one rotation of said motor, said plurality of signals corresponding to known angular positions of said motor, and wherein an angle of approach of said stripe of light onto said object at any given time is calculable based on said known angular positions of said motor and respective times of occurrence of said plurality of signals corresponding to said known angular positions of said motor; and a lamp operationally coupled to said plurality of signals corresponding to said known angular positions of said motor, said lamp being turned on during a finite period of time corresponding to each occurrence of said plurality of signals corresponding to said known angular positions of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein respective times of occurrence of said plurality of signals corresponding to said known angular positions of said motor are ascertainable based on relative brightness of said detected sequence of images as indicated by said stored signals representative of said detected sequence of images.

34. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a holographic disc rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said rotating holographic disc at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is a pulse-generator for providing at least one pulse per one rotation of said motor, said at least one pulse corresponding to a known angular position of said motor, and wherein an angle of approach of said stripe of light onto said object at any given time is calculable based on said known angular position of said motor and time of occurrence of said at least one pulse corresponding to said known angular position of said motor; and a lamp operationally coupled to said at least one pulse corresponding to said known angular position of said motor, said lamp being turned on during a finite period of time corresponding to said occurrence of said at least one pulse corresponding to said known angular position of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein time of occurrence of said at least one pulse corresponding to said known angular position of said motor is ascertainable based on relative brightness of said detected sequence of images as indicated by said stored signals representative of said detected sequence of images.

35. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a holographic disc rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said rotating holographic disc at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is an optical encoder for providing a plurality of signals per one rotation of said motor, said plurality of signals corresponding to known angular positions of said motor, and wherein an angle of approach of said stripe of light onto said object at any given time is calculable based on said known angular positions of said motor and time of occurrence of said plurality of signals corresponding to said known angular positions of said motor; and a lamp operationally coupled to said plurality of signals corresponding to said known angular positions of said motor, said lamp being turned on during a finite period of time corresponding to each occurrence of said plurality of signals corresponding to said known angular positions of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein respective times of occurrence of said plurality of signals corresponding to said known angular positions of said motor are ascertainable based on relative brightness of said detected sequence of images as indicated by said stored signals representative of said detected sequence of images.

36. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a multi-faceted mirror rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said multi-faceted rotating mirror at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is a photodiode for providing at least one signal per one rotation of said motor, said at least one signal corresponding to a known angular position of said motor, and wherein an angle of approach of said stripe of light onto said object at any given time is calculable based on said known angular position of said motor and time of occurrence of said at least one signal corresponding to said known angular position of said motor; and a lamp operationally coupled to said at least one signal corresponding to said known angular position of said motor, said lamp being turned on during a finite period of time corresponding to said occurrence of said at least one signal corresponding to said known angular position of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein time of occurrence of said at least one signal corresponding to said known angular position of said motor is ascertainable based on relative brightness of said detected sequence of images as indicated by said stored signals representative of said detected sequence of images.

37. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a multi-faceted mirror rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said multi-faceted rotating mirror at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is a photodiode for providing at least one signal per one rotation of said motor, said at least one signal corresponding to a known angular position of said motor, and wherein an angle of approach of said stripe of light onto said object at any given time is calculable based on said known angular position of said motor and time of occurrence of said at least one signal corresponding to said known angular position of said motor; and an audio-signal generator operationally coupled to said at least one signal corresponding to said known angular position of said motor, said audio-signal generator generating an audio signal indicative of time of occurrence of said at least one signal corresponding to said known angular position of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein said time of occurrence of said at least one signal corresponding to said known angular position of said motor is ascertainable based on said audio signal.

38. The system according to claim 37 wherein said audio-signal generator comprises a telephone tone generator.

39. The system according to claim 37 wherein said audio-signal generator comprises a digital encoder.

40. A system for determining a three-dimensional profile of an object comprising:

a light-source unit for projecting a stripe of light onto said object and creating a luminous contour line at an intersection of said stripe of light and said object, said light-source unit being adapted to variably position said stripe of light onto said object, wherein said light-source unit has a light-stripe generator and a holographic disc rotatingly driven by a motor at a known angular velocity for variably deflecting said stripe of light onto said object;

an image-detecting device for detecting a sequence of images each containing at least one image of luminous contour line, said image-detecting device producing for each image signals representative of said each image, including signals representative of two-dimensional coordinates of detected contour line, wherein said image-detecting device is located relative to said rotating holographic disc at a known position, and wherein depth coordinates corresponding to said two-dimensional coordinates of said detected contour line for each image are calculable by triangulation based on an angle of approach of said stripe of light onto said object corresponding to said detected contour line, whereby a plurality of three-dimensional coordinates representative of said three-dimensional profile of said object are determined, and wherein said signals representative of said each image and said signal related to said angle of approach of said stripe of light onto said object for said at least one position of said stripe of light on said object are each stored on a data storage medium, and wherein said stored signals are subsequently processed by a data-processing apparatus to determine said plurality of three-dimensional coordinates representative of said three-dimensional profile of said object;

an angle indicator for generating a signal related to an angle of approach of said stripe of light onto said object for at least one position of said stripe of light on said object, wherein said angle indicator is a photodiode for providing at least one signal per one rotation of said motor, said at least one signal corresponding to a known angular position of said motor, and wherein an angle of approach of said stripe of light onto said object at any given time is calculable based on said known angular position of said motor and time of occurrence of said at least one signal corresponding to said known angular position of said motor; and a lamp operationally coupled to said at least one signal corresponding to said known angular position of said motor, said lamp being turned on during a finite period of time corresponding to said occurrence of said at least one signal corresponding to said known angular position of said motor;

wherein said angle of approach of said stripe of light onto said object corresponding to each detected contour line is calculable based on said known angular velocity of said motor and said stored signal related to said angle of approach of said stripe of light onto said object for said at least one position of said stripe of light on said object;

and wherein time of occurrence of said at least one signal corresponding to said known angular position of said motor is ascertainable based on relative brightness of said detected sequence of images as indicated by said stored signals representative of said detected sequence of images.

41. A method of determining a three-dimensional profile of an object using a portable scanning system, comprising:

sequentially positioning a stripe of light at a plurality of locations on said object to create a corresponding sequence of positions of a luminous contour line, said luminous contour line being generated at an intersection of said stripe of light and said object;

detecting by means of an image-detecting device a sequence of images of said luminous contour line corresponding to said sequence of positions of said luminous contour line, wherein said image-detecting device is one of a TV camera, a video camera and a CCD camera;

for each of said sequence of images of said luminous contour line, generating signals representative of said each image;

storing said signals representative of said sequence of images of said luminous contour line as video signals;

generating a signal related to an angle of approach of said stripe of light onto said object for at least one position of said luminous contour line on said object;

storing said signal related to said angle of approach of said stripe of light onto said object for said at least one position of said luminous contour line, as one of an audio signal, a video signal and a pulse signal;

calculating a plurality of three-dimensional coordinates representative of said three-dimensional profile of said object based on said stored signals representative of said sequence of images of said luminous contour line and said stored signal related to said angle of approach of said stripe of light onto said object for said at least one position of said luminous contour line.

42. The method according to claim 41, wherein said step of calculating said plurality of three-dimensional coordi-nates representative of said three-dimensional profile of said object comprises:

determining, based on said angle of approach of said stripe of light onto said object for said at least one position of said luminous contour line, an angle of approach of said stripe of light onto said object for each of said sequence of positions of said luminous contour line as indicated by said stored signals representative of said sequence of images of said luminous contour line; and for each of said sequence of positions of said luminous contour line, calculating by triangulation depth coordinates corresponding to two-dimensional coordinates of said luminous contour line as indicated by said stored signals representative of said image of said luminous contour line.

43. The method according to claim 42 wherein said signal related to said angle of approach of said stripe of light onto said object for said at least one position of said luminous contour line is derived from an electrical pulse.

44. The method according to claim 42, wherein said signal related to said angle of approach of said stripe of light onto said object for said at least one position of said luminous contour line comprises an audio signal.

45. A method of determining a three-dimensional profile of an object comprising:

sequentially positioning a stripe of light at a plurality of locations on said object to create a corresponding sequence of positions of a luminous contour line, said luminous contour line being generated at an intersection of said stripe of light and said object;

detecting by means of an image-detecting device a sequence of images of said luminous contour line corresponding to said sequence of positions of said luminous contour line;

for each of said sequence of images of said luminous contour line, generating signals representative of said each image;

storing said signals representative of said sequence of images of said luminous contour line;

generating a signal related to an angle of approach of said stripe of light onto said object for at least one position of said luminous contour line on said object, wherein said signal related to said angle of approach of said stripe of light is an intensity level of ambient light illuminating said object;

storing said signal related to said angle of approach of said stripe of light onto said object for said at least one position of said luminous contour line; and calculating a plurality of three-dimensional coordinates representative of said three-dimensional profile of said object based on said stored signals representative of said sequence of images of said luminous contour line and said stored signal related to said angle of approach of said stripe of light onto said object for said at least one position of said luminous contour line, wherein said step of calculating said plurality of three-dimensional coordinates comprises:

determining, based on said angle of approach of said stripe of light onto said object for said at least one position of said luminous contour line, an angle of approach of said stripe of light onto said object for each of said sequence of positions of said luminous contour line as indicated by said stored signals representative of said sequence of images of said luminous contour line; and for each of said sequence of positions of said luminous contour line, calculating by triangulation depth coordinates corresponding to two-dimensional coordinates of said luminous contour line as indicated by said stored signals representative of said image of said luminous contour line.

46. A method of obtaining data representative of a 3-D shape of an object using a portable scanning system, which method comprises:

generating a plurality of luminous contour lines of said object by projecting a beam of light onto said object at a corresponding plurality of angles of approach relative to said object;

detecting a sequence of images of said object using an image-detecting device of said portable scanning system, said image-detecting device being one of a TV camera, a video camera and a CCD camera, each image containing a luminous contour line of said object associated with a corresponding one of the plurality of angles of approach of said beam of light relative to said object;

recording said sequence of images of said object as video signals; and recording at least one signal related to the one of the plurality of angles of approach of said beam of light relative to said object as one of an audio signal, a video signal and a pulse signal.

47. The method according to claim 46, wherein said step of recording at least one signal related to the one of the plurality of angles of approach of said beam of light relative to said object occurs during said recording of a sequence of images of said object.

48. The method according to claim 47, wherein time of said recording of said at least one signal related to the one of the plurality of angles of approach of said beam of light is calculable relative to time of recording of at least one image recorded during said recording of said sequence of images of said object.

49. The method according to claim 48, wherein each recorded image of said object is in the form of recorded signals comprising pixel information representative of the recorded image, the pixel information for each recorded image comprising information for each of a plurality of individual pixels.

50. The method according to claim 49, wherein said at least one signal related to the one of the plurality of angles of approach of said beam of light relative to said object comprises an audio signal.

51. A portable system for obtaining data representative of a 3-D shape of an object, which comprises:

an illumination source for projecting a beam of light onto said object at a plurality of angles of approach relative to said object;

a photographic detecting device for detecting a sequence of images of said object, each image containing a luminous contour line of said object associated with a corresponding angle of approach of said beam of light relative to said object, wherein said photographic detecting device is one of a TV camera, video camera and a CCD camera;

an angle indicator for generating a signal related to one of the plurality of angles of approach of said beam of light relative to said object; and at least one data storage for storing at least one of pulse signals, audio signals and video signals, wherein data representative of said sequence of images of said object are stored as video signals and one of said signal related to one of the plurality of angles of approach of said beam of light relative to said object and a signal derived from said signal related to said one of the plurality of angles of approach of said beam of light relative to said object is stored as one of a pulse signal, an audio signal and a video signal.

52. The system according to claim 51, wherein said photographic detecting device generates electrical signals comprising pixel information representative of the detected image of said object and said luminous contour line, the pixel information for each image comprising information for each of a plurality of individual pixels, and wherein said storage device stores said electrical signals comprising pixel information.

53. The system according to claim 52 further comprising a mechanical holder, wherein said illumination source and said photographic detecting device are coupled to said mechanical holder, and wherein relative spacing between said illumination source and said photographic detecting device is adjustable.

54. The system according to claim 53, wherein said angle indicator is an audio-signal generator.

55. The system according to claim 54, wherein said photographic detecting device is adjustably and detachably coupled to said mechanical holder.

56. A method of using a portable scanning system for measuring 3-D shape of an object, said portable system comprising an illumination source, a photographic detecting device, an angle indicator and a data storage device, which method comprises:

generating a plurality of luminous contour lines of said object by using said illumination source to project a beam of light onto said object at a corresponding plurality of angles of approach relative to said object;

detecting a sequence of images of said object using an image-detecting device of said portable scanning system, said image-detecting device being one of a TV camera, a video camera and a CCD camera, each image containing a luminous contour line of said object associated with a corresponding angle of approach of said beam of light relative to said object;

recording said sequence of images of said object as video signals; and recording a signal related to one of the plurality of angles of approach of said beam of light relative to said object as one of an audio signal, a video signal and a pulse signal;

wherein time of said recording of said signal related to one of the plurality of angles of approach of said beam of light is calculable relative to time of recording of at least one of said sequence of images of said object, and wherein each recorded image of said object is in the form of recorded signals comprising pixel information representative of the recorded image, the pixel information for each recorded image comprising information for each of a plurality of individual pixels.

57. The method according to claim 56, further comprising the steps of:

for each recorded images of said object, associating pixel information representative of recorded luminous contour line of said object with a corresponding angle of approach of said beam of light relative to said object based on said signal related to one of the plurality of angles of approach of said beam of light; and using the associated angle information and pixel information to determine three dimensional X, Y, Z coordinates representative of the 3-D shape of said object.

* * * * *